(12) United States Patent
Nuernberger et al.

(10) Patent No.: US 8,726,587 B2
(45) Date of Patent: May 20, 2014

(54) MODULE RAIL FOR PHOTOVOLTAIC SYSTEM

(75) Inventors: Eric Roland Nuernberger, Highland, IL (US); William E. McCarthy, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/310,418

(22) Filed: Dec. 2, 2011

(65) Prior Publication Data
US 2013/0141845 A1  Jun. 6, 2013

(51) Int. Cl.
*E04D 13/18* (2006.01)
*E04H 14/00* (2006.01)

(52) U.S. Cl.
USPC ........... 52/173.3; 52/465; 52/469; 52/506.08; 136/244; 126/623; 248/121; 248/237

(58) Field of Classification Search
USPC ........ 52/705, 667, 173.3, 235, 460, 470, 465, 52/463, 466, 469, 506.08, 244, 245; 136/244, 243, 206; 257/433; 126/621, 126/622, 623; 248/121, 237
See application file for complete search history.

(56) References Cited

U.S. PATENT DOCUMENTS

| | | |
|---|---|---|
| 325,235 A | 9/1885 | Blumer |
| 329,615 A | 11/1885 | Andrews |
| 1,724,595 A | 8/1929 | Hyle |
| 2,034,258 A | 3/1936 | Hausser |
| 2,034,494 A | 3/1936 | Stoll |
| 2,069,402 A | 2/1937 | Cowlin |
| 2,179,575 A | 11/1939 | Hosking |
| 2,250,280 A | 7/1941 | Starbird |
| 2,271,732 A | 2/1942 | Chappuis |
| 3,190,208 A * | 6/1965 | Styne et al. ................... 454/296 |
| 3,340,494 A | 9/1967 | Gutshall |
| 3,481,381 A | 12/1969 | Black |
| 3,761,867 A | 9/1973 | Churla |

(Continued)

FOREIGN PATENT DOCUMENTS

DE 202008000997 U1 6/2008
DE 202009008652 U1 10/2009

(Continued)

OTHER PUBLICATIONS

United States Patent Office, U.S. Appl. No. 13/310,413 Office action dated Jun. 13, 2013, 10 pages, United States.

(Continued)

*Primary Examiner* — Chi Q Nguyen
(74) *Attorney, Agent, or Firm* — Senniger Powers LLP

(57) ABSTRACT

A module rail for a photovoltaic system includes a module-supporting surface, and upper portion, and opposing vertical sidewalls. A first set of openings are spaced apart from one another along the length of the rail. Each of the openings in the first set extend through the upper portion for receiving a first set of fasteners for use in securing at least one photovoltaic module to the module rail. A second set of openings are spaced apart from one another along the length of the rail. Each of the openings in the second set extending through at least one of the module-supporting surface and one of the sidewalls for receiving a second set of fasteners for use in securing at least one photovoltaic module to the module rail.

20 Claims, 26 Drawing Sheets

(56) References Cited

U.S. PATENT DOCUMENTS

| | | | |
|---|---|---|---|
| 4,022,262 A | 5/1977 | Gunn | |
| 4,023,882 A | 5/1977 | Pettersson | |
| 4,406,505 A | 9/1983 | Avramovich | |
| 4,452,027 A * | 6/1984 | Desai | 52/712 |
| 4,473,714 A | 9/1984 | Brownell et al. | |
| 4,659,870 A | 4/1987 | Jones | |
| 4,704,058 A | 11/1987 | Crunwell | |
| 4,900,209 A | 2/1990 | Reynolds | |
| 4,961,712 A | 10/1990 | Schwenk et al. | |
| 5,078,613 A | 1/1992 | Salmon | |
| 5,100,506 A | 3/1992 | Sturtevant et al. | |
| 5,207,588 A | 5/1993 | Ladouceur et al. | |
| 5,236,272 A | 8/1993 | Hibbard | |
| 5,399,096 A | 3/1995 | Quillet et al. | |
| 5,435,746 A | 7/1995 | Leeb | |
| 5,441,417 A | 8/1995 | Ladouceur et al. | |
| 5,453,027 A | 9/1995 | Buell et al. | |
| 5,501,008 A | 3/1996 | Leeb | |
| 5,505,788 A | 4/1996 | Dinwoodie | |
| 5,571,338 A | 11/1996 | Kadonome et al. | |
| 5,620,290 A | 4/1997 | Homfeldt et al. | |
| 5,644,830 A | 7/1997 | Ladouceur et al. | |
| 5,828,008 A | 10/1998 | Lockwood et al. | |
| 6,105,317 A | 8/2000 | Tomiuchi et al. | |
| 6,347,915 B1 | 2/2002 | Balzano | |
| 6,368,038 B1 | 4/2002 | Uno | |
| 6,617,507 B2 | 9/2003 | Mapes et al. | |
| 6,939,097 B2 | 9/2005 | Carr et al. | |
| 6,987,660 B2 | 1/2006 | Stevenson et al. | |
| 7,307,209 B2 | 12/2007 | Mapes et al. | |
| 7,435,134 B2 | 10/2008 | Lenox | |
| 7,600,349 B2 * | 10/2009 | Liebendorfer | 52/173.3 |
| 7,694,466 B2 | 4/2010 | Miyamoto et al. | |
| 7,748,175 B2 * | 7/2010 | Liebendorfer | 52/173.3 |
| 7,780,472 B2 | 8/2010 | Lenox | |
| 8,266,848 B2 * | 9/2012 | Miros et al. | 52/173.3 |
| 8,316,590 B2 * | 11/2012 | Cusson | 52/173.3 |
| 8,341,900 B2 * | 1/2013 | Reyal et al. | 52/235 |
| 8,424,821 B2 * | 4/2013 | Liu | 248/237 |
| 8,550,419 B2 | 10/2013 | Hausner et al. | |
| 2003/0094193 A1 | 5/2003 | Mapes et al. | |
| 2004/0163338 A1 * | 8/2004 | Liebendorfer | 52/173.1 |
| 2008/0000173 A1 | 1/2008 | Lenox et al. | |
| 2008/0087320 A1 | 4/2008 | Mapes et al. | |
| 2008/0169018 A1 | 7/2008 | Miyamoto et al. | |
| 2009/0000220 A1 | 1/2009 | Lenox | |
| 2009/0256046 A1 | 10/2009 | Hausner et al. | |
| 2010/0089390 A1 | 4/2010 | Miros et al. | |
| 2010/0132274 A1 | 6/2010 | Reyal et al. | |
| 2010/0132769 A1 | 6/2010 | Potter et al. | |
| 2010/0139742 A1 | 6/2010 | Wayman et al. | |
| 2010/0237028 A1 | 9/2010 | Cusson | |
| 2010/0237029 A1 | 9/2010 | Cusson et al. | |
| 2010/0275975 A1 | 11/2010 | Monschke et al. | |
| 2010/0307074 A1 * | 12/2010 | Stearns et al. | 52/173.1 |
| 2011/0036028 A1 | 2/2011 | Beck | |
| 2011/0214366 A1 | 9/2011 | Haddock et al. | |
| 2011/0214367 A1 | 9/2011 | Haddock et al. | |
| 2011/0214368 A1 | 9/2011 | Haddock et al. | |
| 2012/0272613 A1 * | 11/2012 | Cusson et al. | 52/745.2 |
| 2013/0048056 A1 | 2/2013 | Kilgore et al. | |
| 2013/0139869 A1 | 6/2013 | Nuernberger et al. | |
| 2013/0139870 A1 | 6/2013 | Nuernberger et al. | |

FOREIGN PATENT DOCUMENTS

| | | |
|---|---|---|
| DE | 102010022556 B3 | 6/2011 |
| DE | 102010008867 A1 | 10/2011 |
| FR | 2949487 A1 | 4/2011 |
| JP | 06309640 A | 11/1994 |
| WO | 2008028151 A2 | 3/2008 |

OTHER PUBLICATIONS

United States Patent Office, U.S. Appl. No. 13/310,404 Office action dated Apr. 12, 2013, 9 pages, United States.

Cooper B-Line, SRIS-001 Arista™ Mounting System Instruction Sheet Solar Rooftop Support Ballasted, 9 pages, United States, Mar. 1, 2011 (at least as early as).

Cooper B-Line, SRIS-001 Arista™ Mounting System Instruction Sheet Portrait Hold Down Clamp Assembly, 5 pages, United States, Mar. 1, 2011 (at least as early as).

Cooper B-Line, Cooper B-Line Catalog, Beams, undated, 24 pages, Highland, Illinois, United States, Jan. 1, 2010 (at least as early as).

* cited by examiner

MODULE RAIL FOR PHOTOVOLTAIC SYSTEM

FIELD OF THE DISCLOSURE

The present disclosure generally relates to a module rail for a photovoltaic system.

BACKGROUND

A photovoltaic system (or PV system) is a system which uses one or more photovoltaic modules (or solar panels) to convert sunlight into electricity. The system may include multiple components, including the photovoltaic modules, a racking assembly on which the modules are mounted, mechanical and electrical connections, and devices for regulating and/or modifying the electrical output. Most photovoltaic systems include a photovoltaic array, which is a linked collection of photovoltaic modules. In the case of ground-mounted photovoltaic systems, the photovoltaic modules are mounted on a plurality of racking assemblies assembled in vacant land areas. Such ground-mounted photovoltaic systems may include thousands, if not tens of thousands, photovoltaic modules. Accordingly, the time it takes to assemble each racking assembly and mount the photovoltaic modules on the racking assemblies is a significant contributor to the overall cost of the photovoltaic system. Saving even minutes during assembly of the racking assembly and during mounting of the photovoltaic modules to the racking assemblies may significantly reduce the overall cost of the photovoltaic system.

SUMMARY

In one aspect, a module rail for a photovoltaic system has a length and generally comprises a module-supporting surface extending along the length of the module rail for supporting at least one photovoltaic module thereon. An upper portion apart from and generally adjacent the module-supporting surface extends along the length of the module rail. Opposing vertical sidewalls extends downward from adjacent the module-supporting surface. A first set of openings are spaced apart from one another along the length of the rail. Each of the openings in the first set extend through the upper portion for receiving a first set of fasteners for use in securing at least one photovoltaic module to the module rail. A second set of openings are spaced apart from one another along the length of the rail. Each of the openings in the second set extend through at least one of the module-supporting surface and one of the sidewalls for receiving a second set of fasteners for use in securing at least one photovoltaic module to the module rail.

In another aspect, a photovoltaic system generally comprises an elongate pier extending upward from the ground. The pier has a length extending from a lower end to an upper end of the pier. A pier cap is secured to the pier. The pier cap comprises a support beam extending generally transverse to the length of the pier. The pier cap has an upper support surface. A module rail is secured to the upper support surface of the pier cap. The module rail comprises first and second module-supporting surfaces extending along the length of the module rail for supporting at least one photovoltaic module thereon. A central portion of the module rail extends along the length of the module rail and is disposed between and separates the first and second module-supporting surfaces. Opposing rail sidewalls extend downward from the respective first and second module-supporting surfaces. A first set of openings are spaced apart from one another along the length of the rail and extend through the central portion for use in securing the at least one photovoltaic module to the rail. A second set of openings are spaced apart from one another along the length of the rail and extend through at least one of the first and second module-supporting surfaces and the rail sidewalls for use in securing the at least one photovoltaic module to the rail. The second set of openings are adjacent a juncture of at least one of the module-supporting surfaces and the corresponding sidewalls. At least one photovoltaic module is secured to the module rail. And, at least one of: a first fastener is inserted in one of the openings of the first set and engaging the at least one photovoltaic module to secure the at least photovoltaic module to the module rail; and a second fastener is inserted in one of the openings of the second set and engaging the at least one photovoltaic module to secure the at least photovoltaic module to the module rail.

In yet another aspect, a racking assembly for a photovoltaic system generally comprises a module rail comprising a module-support portion for supporting at least one photovoltaic module, opposing sidewalls extending downward from opposite sides of the module-support portion, opposite lower flanges extending outward from lower ends of the respective sidewalls, and a rail fastener opening in at least one of the lower flanges. At least one pier cap is securable adjacent an upper end of a pier. The at least one pier cap comprises a support beam having an upper support surface for supporting the module rail, and a rail fastener extending upward from the upper support surface for securing the rail to the upper support surface. The rail fastener opening and the rail fastener are configured such that the rail fastener is insertable up through the rail fastener opening from below the rail and the rail fastener is thereafter positionable with respect to the rail fastener opening to engage the lower flange for securing the rail to the at least one pier cap.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
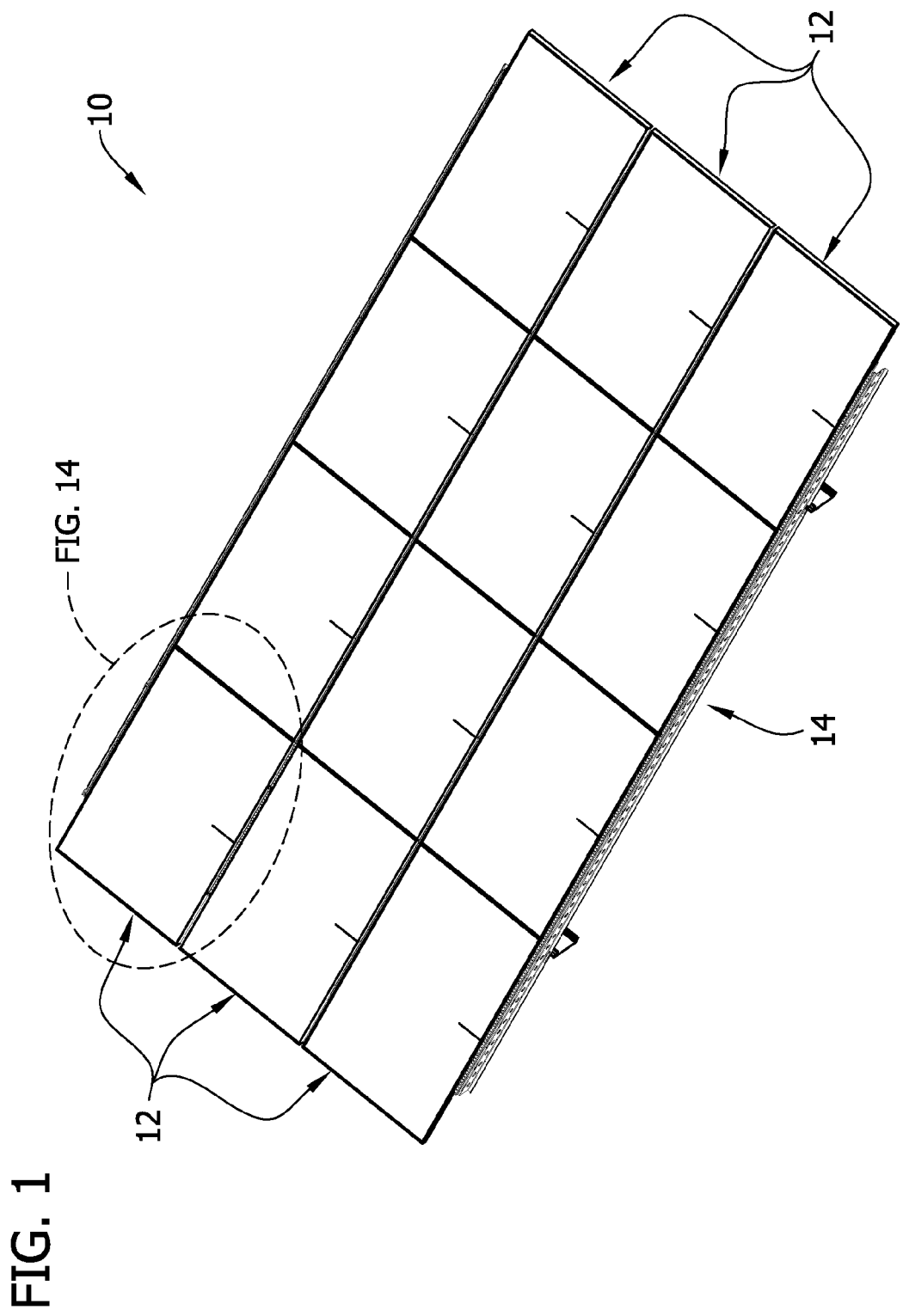
FIG. 1 is a perspective of one embodiment of a photovoltaic system, the system including a plurality of photovoltaic modules mounted on a racking assembly.
Figure 2:
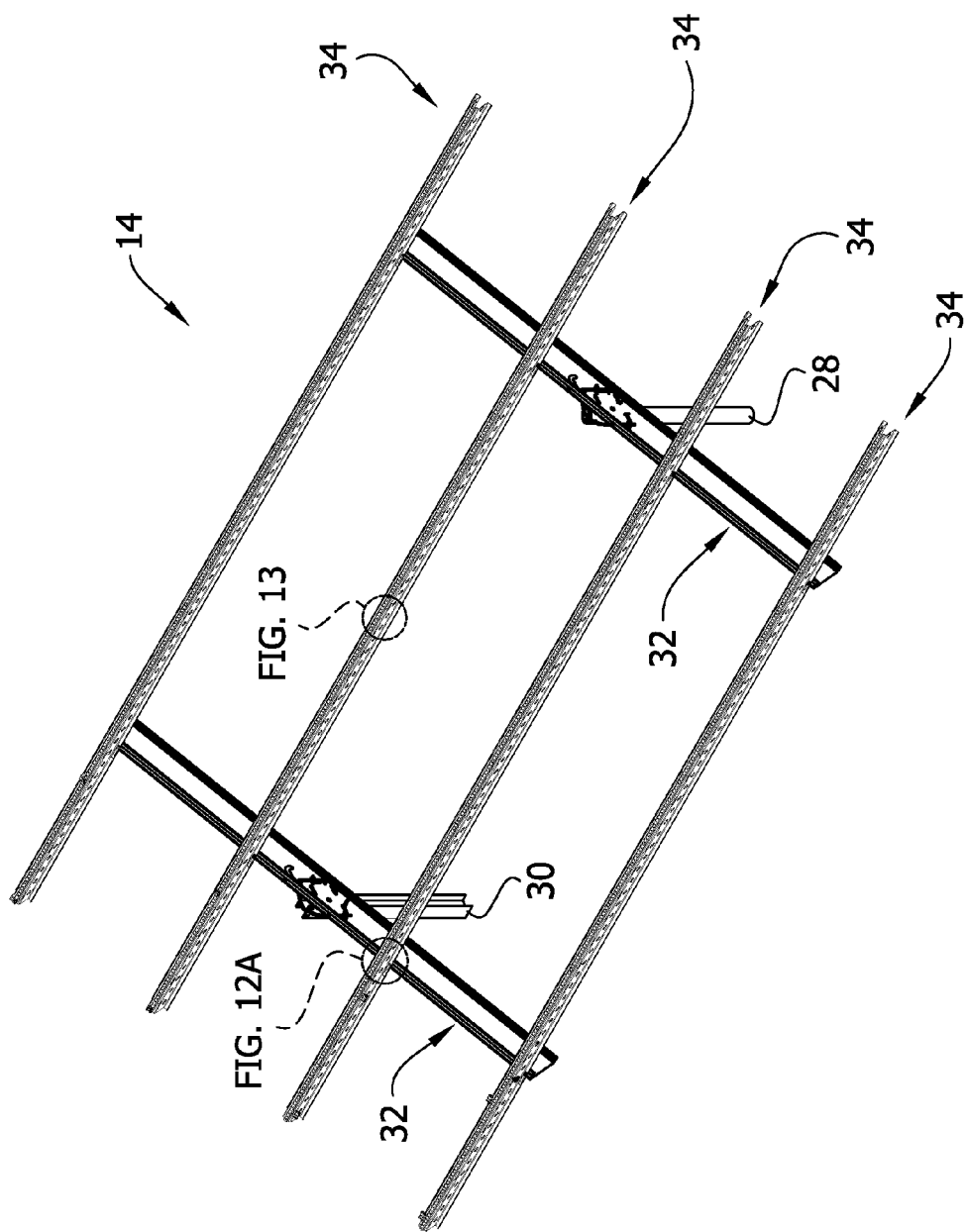
FIG. 2 is a perspective of the racking assembly in FIG. 1, with the photovoltaic modules removed therefrom, the racking assembly including a pair of piers, pier caps secured to the respective piers, and module rails secured to and extending across the pier caps.

Referring now to the drawings, and in particular to FIGS. 1 and 2, one embodiment of a photovoltaic system is generally indicated at reference numeral 10. The photovoltaic system includes a plurality of photovoltaic modules (also referred to herein as "modules"), each generally indicated at 12, mounted on a mounting or racking assembly, generally indicated at 14. As explained in more detail below, the racking assembly 14 disclosed herein is a ground racking assembly configured for ground mounting of the photovoltaic system 10. It is understood that aspects of this illustrated embodiment, as disclosed herein below, may be used in a rooftop racking assembly configured for mounting the photovoltaic system on a roof of a building or other structure.

Figure 3:
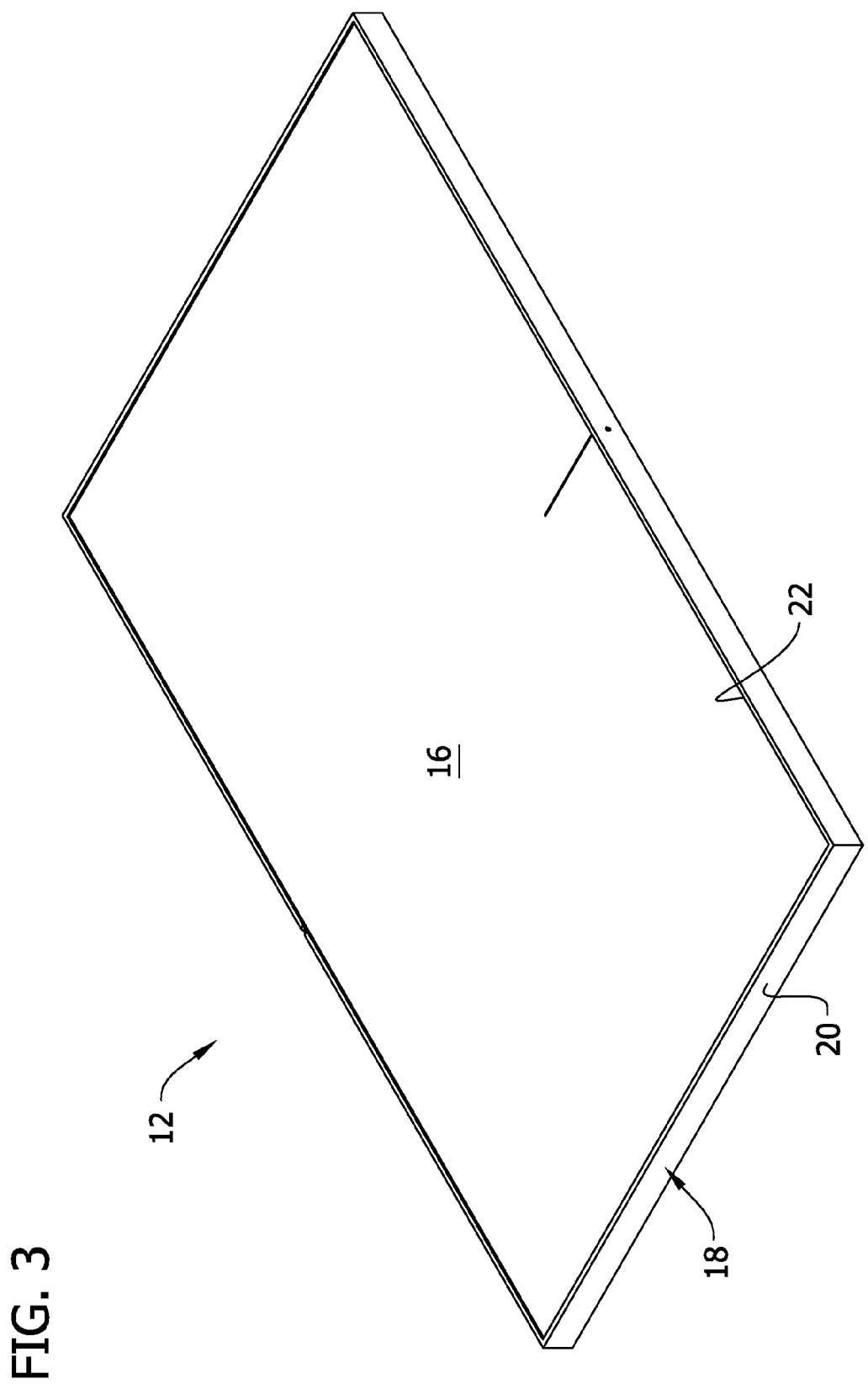
FIG. 3 is an enlarged perspective of one of the photovoltaic modules in FIG. 1.

Referring to FIGS. 1 and 3, each module 12 has a generally rectangular perimeter, having a length and a width. The module includes a photovoltaic cell assembly 16, and a module frame 18 secured to a perimeter of cell assembly. The photovoltaic cell assembly 16 includes a plurality of photovoltaic cells (not shown) electrically connected to one another. In general, the photovoltaic cells are solid state electrical devices that convert the energy of light directly into electricity by the photovoltaic effect. As is generally known and understood, the modules 12 of the photovoltaic system 10 may be electrically connected to one another to form a photovoltaic array. The operation and use of photovoltaic arrays are generally known and understood, and beyond the scope of the present disclosure.

Figure 4:
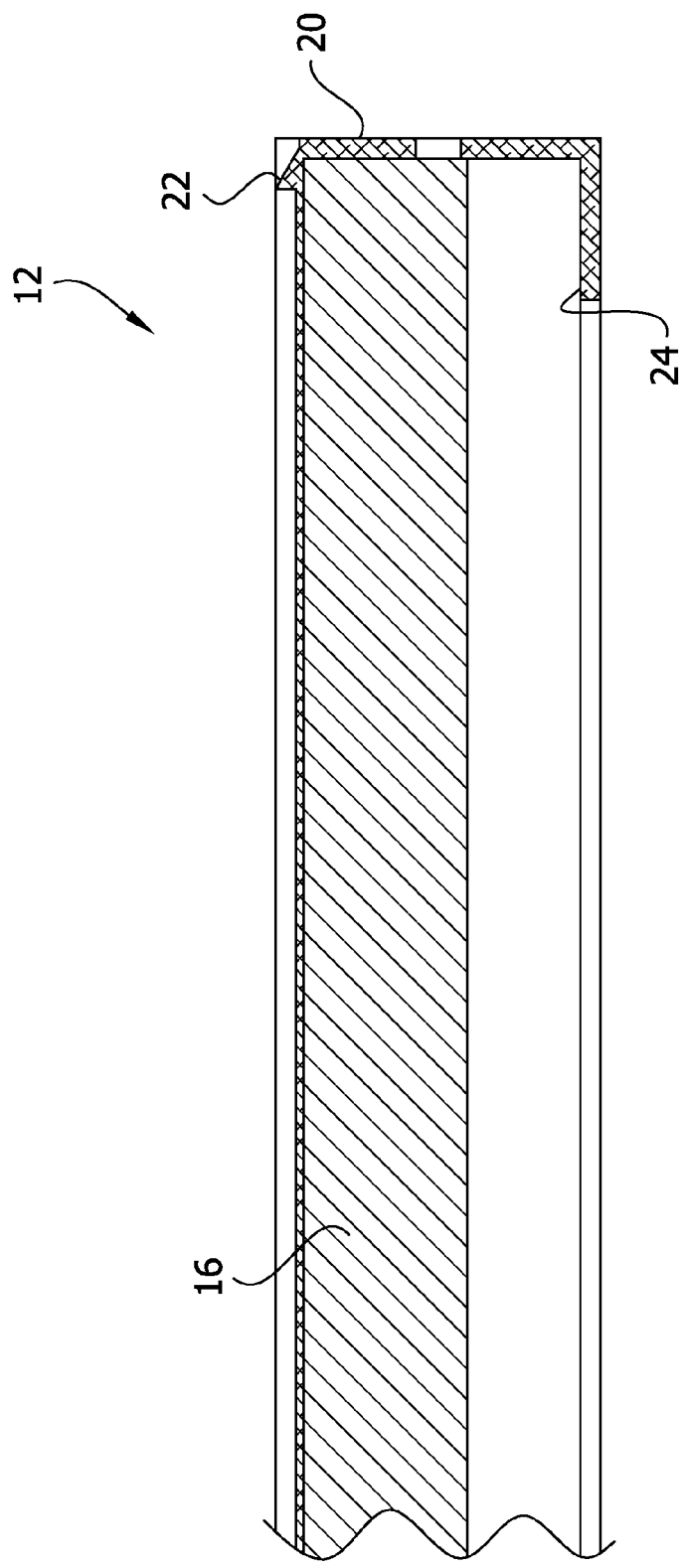
FIG. 4 is an enlarged, fragmentary cross section of the photovoltaic module.

Referring to FIGS. 3 and 4, each of the illustrated module frames 18 has a perimeter sidewall 20, an upper flange 22 extending inward from an upper end of the sidewall, and a lower flange 24 (FIG. 4) extending inward from a lower end of the sidewall. The upper and lower flanges 22, 24, respectively, extend around at least a portion of the perimeter of the module frame 18. The photovoltaic cell assembly 16 is secured adjacent the upper flange 22, and the lower flange 24 is spaced below the cell assembly. The module frames 18 may be constructed from an electrically-conductive material, such as aluminum or another electrically conductive metal, having an electrically non-conductive outer layer disposed over the electrically conductive material. For example, the module frames 18 may be constructed from anodized aluminum, which has an outer anodic layer that is electrically non-conductive. The module frames may be made from other material, such as other metals, and may be coated with other types of electrically non-conductive outer layers, other than anodic layers, or may not have an electrically non-conductive outer layer. It is understood that photovoltaic modules 12 are not presently standardized in the industry, and therefore, the shape, size, and thickness of the anodic layer may vary from manufacturer to manufacturer. Accordingly, the photovoltaic modules may have other configurations without departing from the scope of the present invention.

Referring to FIG. 2, the illustrated racking assembly 14 includes first and second piers 28, 30, respectively, secured to and extending upward from the ground, a pair of spaced apart elongate pier caps, generally indicated at 32, secured to the respective piers, and a set of module rails, each generally indicated at 34 (also referred to herein as "rails"), secured to and extending across the pier caps. As explained in more detail below, the photovoltaic modules 12 are mounted on the module rails 34 so that the modules lie in a plane that is offset from horizontal about 20 degrees to about 30 degrees. As is generally known in the field of photovoltaic systems, photovoltaic systems in the Northern Hemisphere are typically arranged so that the photovoltaic modules face south, while photovoltaic systems in the Southern Hemisphere are typically arranged so that the photovoltaic modules face north. Accordingly, in the illustrated embodiment first pier 28 is an east pier, the second pier 30 is a west pier, the pier caps 28, 30 run generally north to south, and the module rails 34 run generally east to west. Hereinafter, for the purpose of describing relative locations of components and structures, the photovoltaic system 10 described herein is assumed to be implemented in the Northern Hemisphere. It is understood that the photovoltaic system 10 may be assembled in a different orientation without departing from the scope of the present invention.

The piers 28, 30 of the racking assembly may be of various types having different shapes and sizes. For purposes of illustrating two types of piers, the first pier 28 in the illustrated embodiment is a pipe pier and the second pier 30 is an I-beam pier. It is understood that typically the racking assembly 14 will include the same type of pier. Regardless of the type or shape of the pier, lower ends of the piers 28, 30 are secured to the ground, such as by driving and/or cementing the piers in the ground, and the pier caps 32 are secured to upper ends of the respective piers, as explained in more detail below. In one example, the lengths of the piers 28, 30 are customized and based on a specific application. The piers may be constructed from a suitable metal, such as steel (e.g., hot-dip galvanized steel) or aluminum, and may have a suitable load capacity, such as from about 1,000 pounds (4,448 N) to about 10,000 pounds (44,482 N). It is understood that the piers may be of other shapes and sizes without departing from the scope of the present invention. It is also understood that the disclosed racking assembly may include any number of piers, such as one pier, or more than two piers.

In the illustrated embodiment, as shown best in FIGS. 2 and 5-8, each of the pier caps 32 comprises an elongate support beam, generally indicated at 36, having opposite longitudinal ends (e.g., north and south ends), a generally vertical web with inner and outer web faces 38, 40, respectively, and upper and lower flanges 42, 44, respectively, running along the length of the web and extending laterally from adjacent respective upper and lower sides of the inner web face. As explained in detail below, the upper return flanges 42 are used as a support surface for the rails 34, in addition to adding strength to and inhibiting bending of the support beams. The support beams 36 may be formed from a suitable metal, such as steel (e.g., steel with zinc finish) or aluminum, and may be constructed to have a suitable load capacity. The lengths of the support beams 36 may be customized and may depend on a specific application. The support beams 36 may be of other configurations, including other shapes, without departing from the scope of the present invention. It is also understood that the racking 14 assembly may not include the pier caps without departing from the scope of the present invention. For example, the racking assembly 14 may include multiple sets of piers, and each of the module rails 34 may be secured to one of the pier sets by a connector.

Referring to FIGS. 5-8, a pier connection system, generally indicated at 50, is provided on each of the pier caps 32 to secure the pier caps to the respective piers 28, 30. The pier connection system 50 is configurable for selectively securing the pier caps 32 to either the pipe pier 28 (FIGS. 7 and 8) or the I-beam pier 30 (FIGS. 5 and 6) so that the pier caps extend at an angle of about 110 to 120 degrees relative to the longitudinal axis of the pier (i.e., about 20 to 30 degrees relative to horizontal). The pier connection system 50 includes at least one pier cap hanger 52 that engages the upper end of the selected pier 28, 30 to hang the pier cap 32 thereon, and at least one pier clamp (one embodiment indicated by reference numeral 54 in FIGS. 5 and 6, and another embodiment indicated by reference numeral 56 in FIGS. 7 and 8), disposed below the hanger, for clamping the pier cap on a side of the pier. Both the pier cap hanger 52 and the pier clamp 54, 56 are used to secure the pier caps to the piers so that the pier caps extend downward at an angle of about 110 to about 120 degrees relative to the longitudinal axis of the pier (i.e., about 20 to 30 degrees relative to horizontal). Moreover, as explained in more detail below when describing a method of assembling the racking assembly 14, the hanger 52 locates and retains the pier caps 32 at the upper end of the piers 28, 30 prior to tightening the pier clamp 54, 56 to the piers so that the module rails 34 can be fixedly secured to the pier caps before fixedly securing the pier caps to the piers. Assembling the racking assembly 14 in this way facilitates squaring of the racking assembly.

Figure 5:
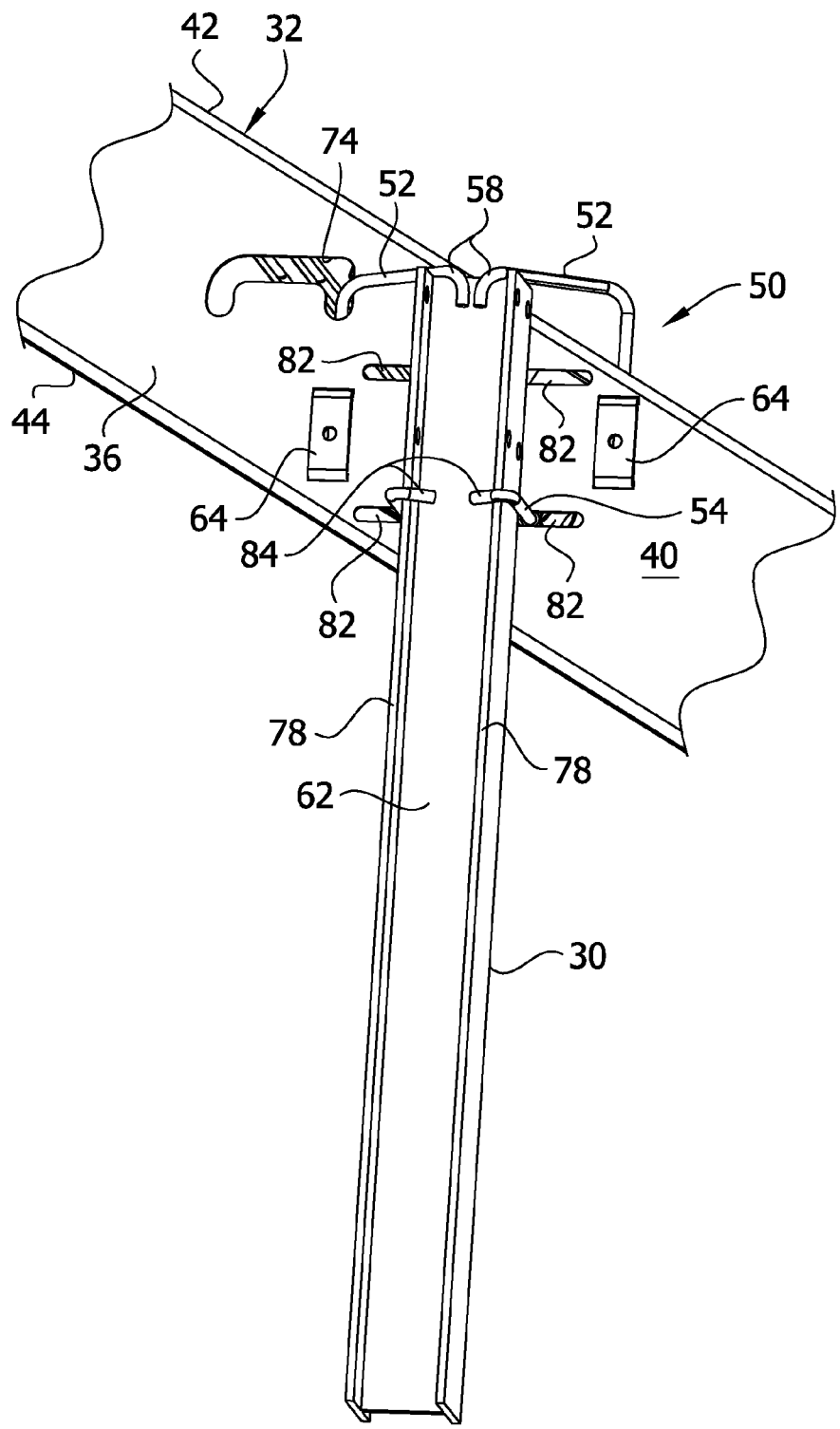
FIG. 5 is a fragmentary left elevational of one embodiment of a pier cap secured to a pier.
Figure 6:
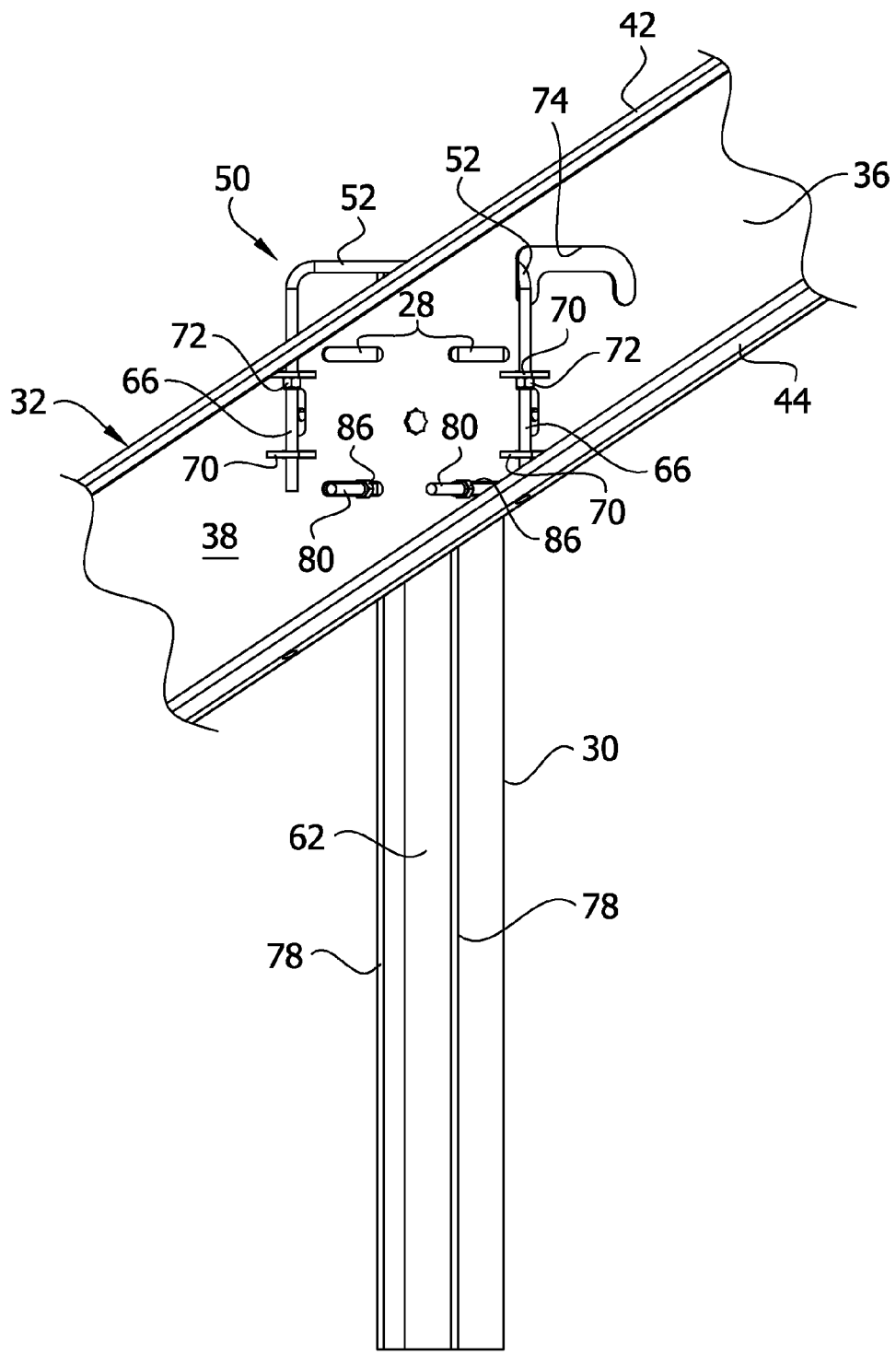
FIG. 6 is a fragmentary right elevational of the pier cap and pier in FIG. 5.

Referring to FIGS. 5 and 6, which shows the pier cap 32 secured to the I-beam pier 30, the pier connection system 50 includes two pier cap hangers 52 mounted on the beam 36. The hangers 52 comprise hanger hooks (e.g., J-hooks, indicated by the same reference numeral 52) that are spaced apart from one another along the length of the pier cap. The same hanger hooks 52 can be used to hook onto the respective upper ends of the pipe pier 28 and the I-beam pier 30, as shown in FIGS. 5-8. For example, bent terminal end margins 58 of the hooks 52 are configured to extend downward into the top opening 60 (FIG. 7) in the upper end of the pipe pie 28, and are configured to engage the central web 62 of the I-beam pier 30 adjacent the upper end of the I-beam pier (FIG. 5). Each of the hanger hooks 52 is secured to a C-shaped bracket 64 attached to the support beam 36 of the pier cap 32. A shank 66 of each hanger hook 52 extends through aligned shank openings 68 in vertically spaced apart arms 70 of the corresponding C-shaped bracket 64. A nut 72 (broadly, a stop) threaded on the shank 66 of the hanger hook 52 inhibits the shank from sliding upward, out of the aligned shank openings 68 when the hanger hook is hanging the pier cap 32 on the upper end of the pier 28, 30. The vertical positions of the hanger hooks 52 relative to the corresponding support beam 36 are independently and selectively adjustable by adjusting the longitudinal positions of the respective nuts 72 (or other stops) on the shanks 66, such as by rotating the nuts on the threaded shanks to move the nuts upward or downward on the shanks. Independently adjusting the vertical positions of the hanger hooks 52 allows for selective adjustment of the angle at which the support beam 36 extends with respect to the corresponding pier 28, 30 and with respect to horizontal. The shank 66 of each hanger hook 52 is also selectively and independently rotatable in the corresponding shank openings 68 about a vertical axis to adjust the horizontal position of the terminal end margin 58 of the hanger hook so that the terminal end margin can hook onto piers of various cross-sectional sizes and shapes. One of the hanger hooks 52 (i.e., the north hook) extends through a clearance slot 74 in the support beam 36 to allow the hook to rotate relative to the support beam. The other hook 52 (i.e., the south hook) extends above and over the upper return flange 42, and therefore, a clearance slot for this hook is not necessary, although an additional clearance opening may be provided. The pier cap hangers may be of other configurations without departing from the scope of the present invention. Moreover, the pier caps may not include pier cap hangers without departing from the scope of the present invention.

Referring to FIGS. 5 and 6, the first embodiment of the pier clamp 54 of the pier-rail connection system 50 comprises opposing clamping hooks (e.g., J-hooks, indicated by the same reference numeral 54) that are spaced apart vertically from one another along the length of the support beam 36 for attaching the pier cap to the I-beam pier 30. In the illustrated embodiment, two pairs of opposing side hooks may be provided with the pier cap 32, although only one pair (a lower pair) is illustrated. The clamping hooks 54 hook onto side flanges 78 of the I-beam pier 30 and clamp the pier cap 32 to the side (e.g., inner side) of the I-beam pier, as shown in FIG. 5. Accordingly, the clamping hooks 54 are broadly considered to be clamps, and other types of clamps may be used in place of the illustrated clamping hooks without departing from the scope of the present invention. Shanks 80 of the clamping hooks 54 extend through respective pier-clamp slots 82 in the support beam 36 of each pier cap 32, and extend outward from the outer web face 40 of the support beam. The pier-clamp slots 82 extend at an angle of about 20 to about 30 degrees with respect to the length of the support beam 36 so that the support beam extends at an angle of about 110 to about 120 degrees relative to the I-beam pier 30. The shanks 80 of the clamping hooks 54 are selectively and individually slidable along the pier-clamp slots 82, when the hooks are not secured to the pier 30, to adjust the horizontal distance between the clamping hooks and allow for the clamping hooks to accommodate I-beam piers 30 of various widths between the side flanges 78.

When securing the clamping hooks 54 to the I-beam pier 30, the shanks 80 run across the respective side flanges 78 of the pier, in contact therewith, and bent terminal end margins 84 of the respective clamping hooks 54 extend around and engage the respective flanges of the pier. Clamping-hook nuts 86 (broadly, clamping-hook stops) threaded on the shanks 80 of the clamping hooks 54 engage the inner web face 38 of the support beam 36. Tightening the clamping-hook nuts 86 on the respective clamping hook shanks 80 when the clamping hooks 54 are in engagement with the I-beam pier 30 inhibits the clamping hooks from withdrawing from and moving within the respective pier-clamp slots 82, and firmly clamps the pier cap 32 to the I-beam pier. Moreover, adjusting the clamping-hook nuts 86 on the respective shanks 80 allows the lengths clamping hooks 54 extending outward from the outer web face 40 to be selectively and individually adjusted (i.e., increased and decreased). Thus, both the length of the clamping hooks 54 extending outward from the outer web face 40 and the spacing between the clamping hooks are selectively adjustable to thereby accommodate I-beam piers 30 (or other piers) having various cross-sectional dimensions.

Figure 7:
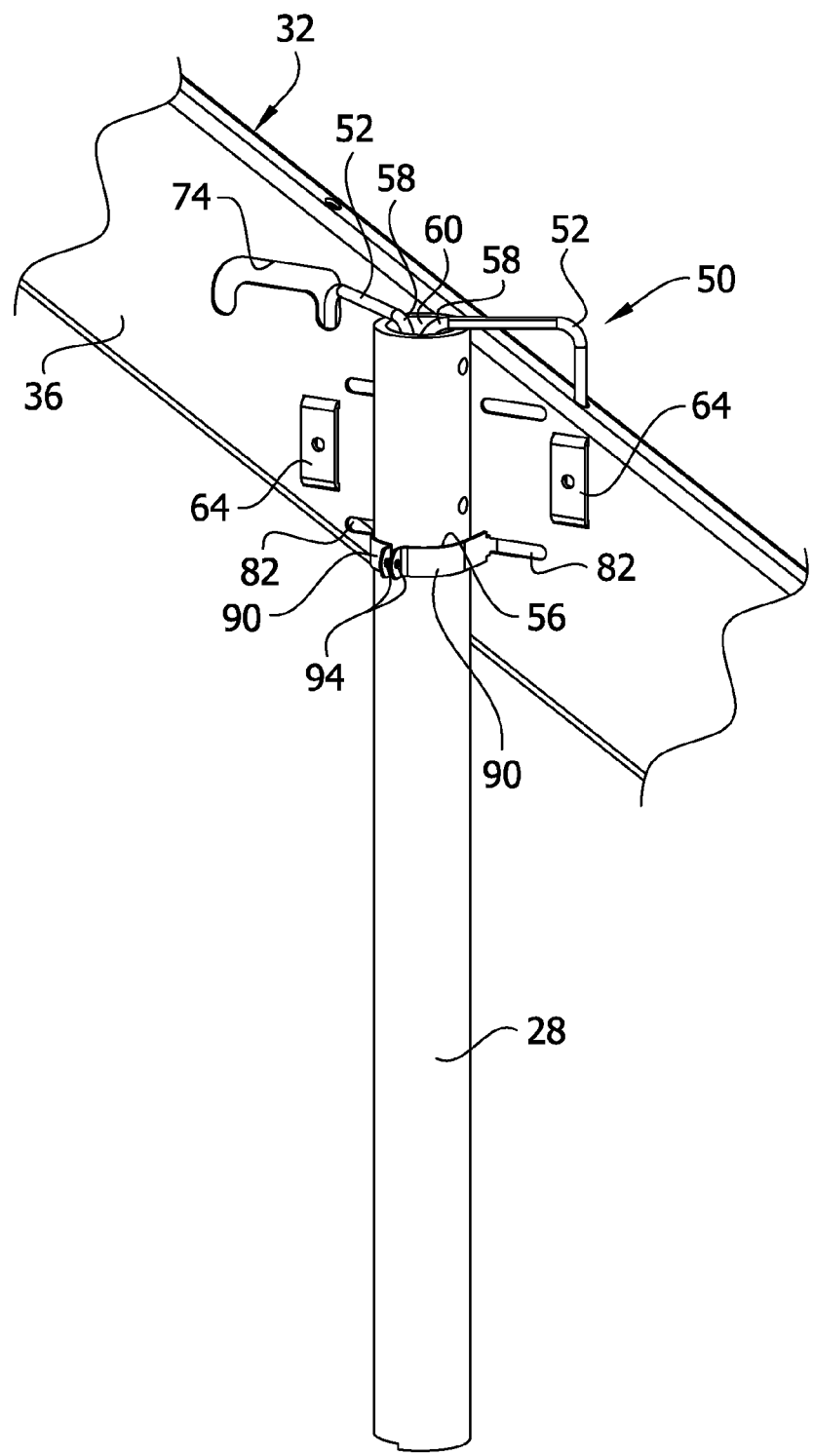
FIG. 7 is a fragmentary left elevational of another embodiment of a pier cap secured to a pier.
Figure 8:
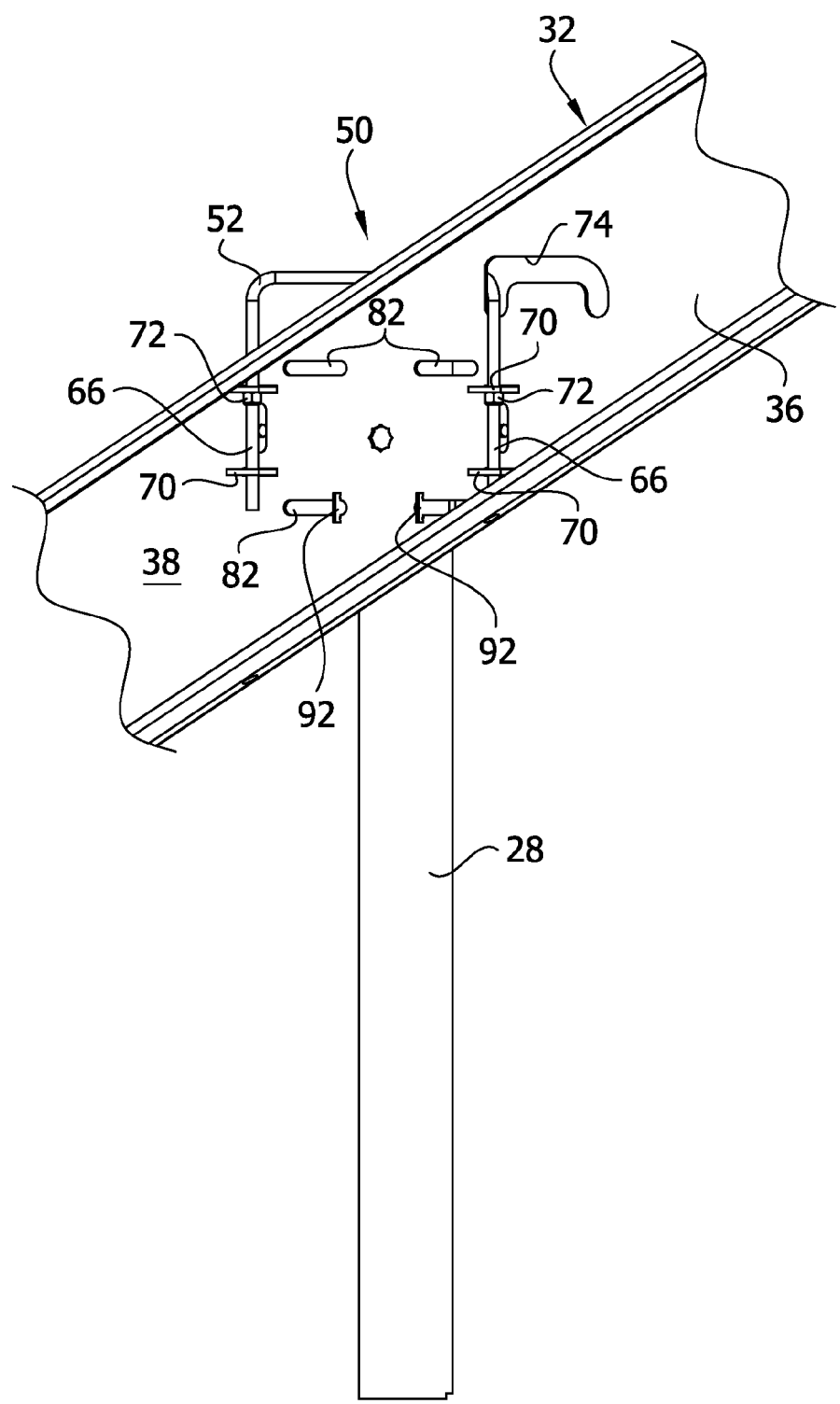
FIG. 8 is a fragmentary right elevational of the pier cap and pier in FIG. 6.

Referring to FIGS. 7 and 8, the second embodiment of the pier clamp 56 pier-rail connection system 50 comprises a pipe clamp (indicated by the same reference numeral 56) for attaching the pier cap 32 to the pipe pier 28. The pipe clamp 56 and the clamping hooks 54 are interchangeable and the remaining components of the pier cap 32 for use with the pipe pier 28 are the same for use with the I-beam pier. In the illustrated embodiment, two pipe clamps may be provided, although only one clamp 56 (a lower clamp) is illustrated. The pipe clamp 56 may be similar to a conventional pipe clamp, such as strut pipe clamp, for securing a pipe to a structure. For example, the illustrated pipe clamp 56 has a two-piece body. Each body piece 90 is arcuate and elongate, and has a tongue 92 at its first end that is insertable into one of the pier-clamp slots 82 in the support beam 36 of the pier cap 32 to attach the body piece to the support beam. The pier-clamp slots 82 allow for the body pieces 90 to slide therein to allow for various sized pipe clamps to be attached thereto to accommodate pipe piers 28 of various shapes and sizes. Bent attachment tabs 94 at the opposite ends of the respective body pieces 90 have aligned fastener openings for receiving a fastener (e.g., a bolt and nut or a screw; not shown) therethrough to secure the two body pieces together and clamp the pier cap 32 to the pipe pier 28. The pier connection system 50 may include other types of fasteners for securing the pier caps 32 to the piers 28, 30 without departing from the scope of the present invention.

Referring back to FIGS. 1 and 2, the illustrated racking assembly 14 includes four module rails 34: a north rail, a south rail, and two intermediate rails between the north and south rails. The rails 34 are spaced apart in the north-south direction so that each photovoltaic module 12 is received between and supported by adjacent rails. In the illustrated embodiment, adjacent rails 34 are spaced apart a suitable distance from one another to mount the modules 12 in landscape orientations. As generally known in the field of photovoltaic systems, the photovoltaic modules 12 are in landscape orientations when the lengths of the modules run east to west and the widths of the modules run north to south. It is understood that the rails 34 may be configured for mounting the modules 12 in portrait orientations, with the lengths of the modules running north to south and the widths of the modules running east to west.

Figure 9:
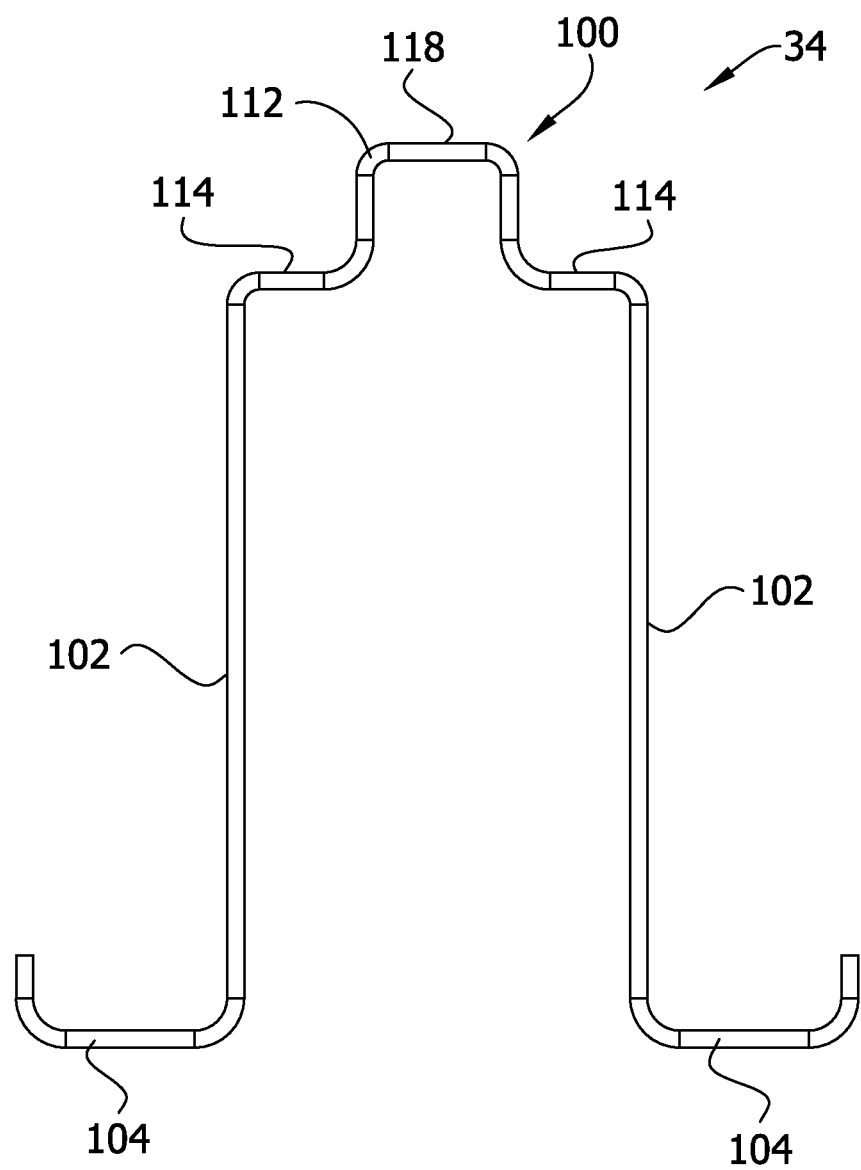
FIG. 9 is an enlarged side elevational view of one of the module rails in FIG. 2.

Referring to FIG. 9, each of the module rails 34 is generally an inverted channel rail having an upper top-hat portion, generally indicated at 100, opposing sidewalls 102 (e.g., north and south sidewalls) extending downward from opposite respective sides of the top-hat portion, and lower flanges 104 extending laterally outward from lower ends of the respective sidewalls. Each module rail may be fabricated from a single sheet of suitable metal, such as steel (e.g., steel with zinc finish) or aluminum, having a suitable gauge, such as from about 11 to about 14 gauge. The module rails 34 may be constructed in other ways (e.g., extrusion), and may be of other configurations without departing from the scope of the present invention. As explained in more detail below, the module rails 34 are configured for mounting the modules 12 thereon using two types of top-down fasteners, generally indicated at 108, 109, respectively, in FIGS. 15-18, and/or clip fasteners, generally indicated at 110 in FIGS. For purposes of illustrating and fully disclosing the top-down fasteners 108, 109 and the clip fasteners 110, only one module 12 in the illustrated embodiment is secured to adjacent rails 34 using the top-down fasteners, and only one module is secured to adjacent rails using the clip fasteners. It is envisioned that in the field all of the modules 12 will be secured to the rails 34 using either the top-down fasteners 108, 109 or the clip fasteners 110, although it is contemplated that some or all of the modules may be secured to the rails using both types of fasteners.

Figure 10:
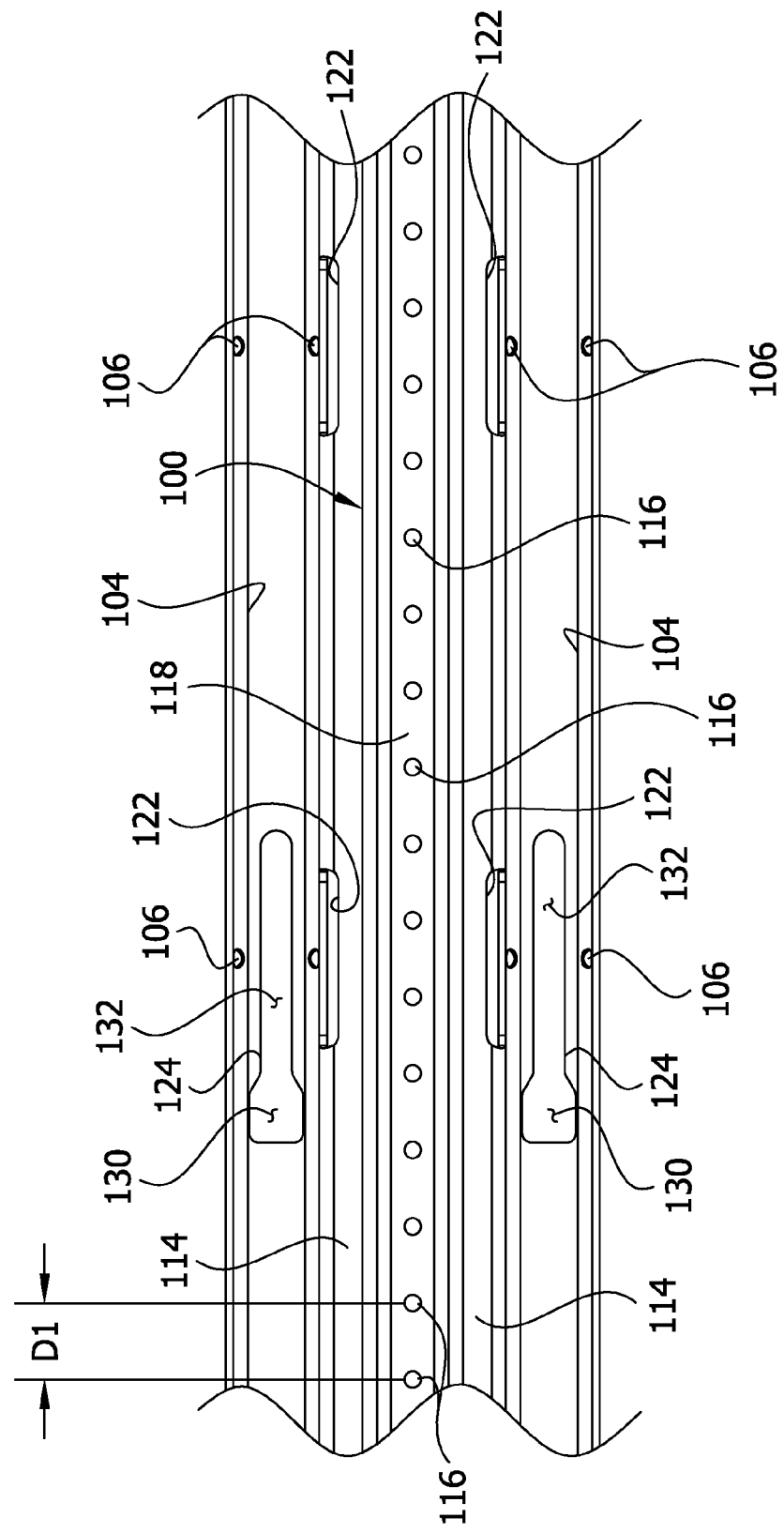
FIG. 10 is an enlarged, fragmentary top plan view of the module rail.
Figure 11:
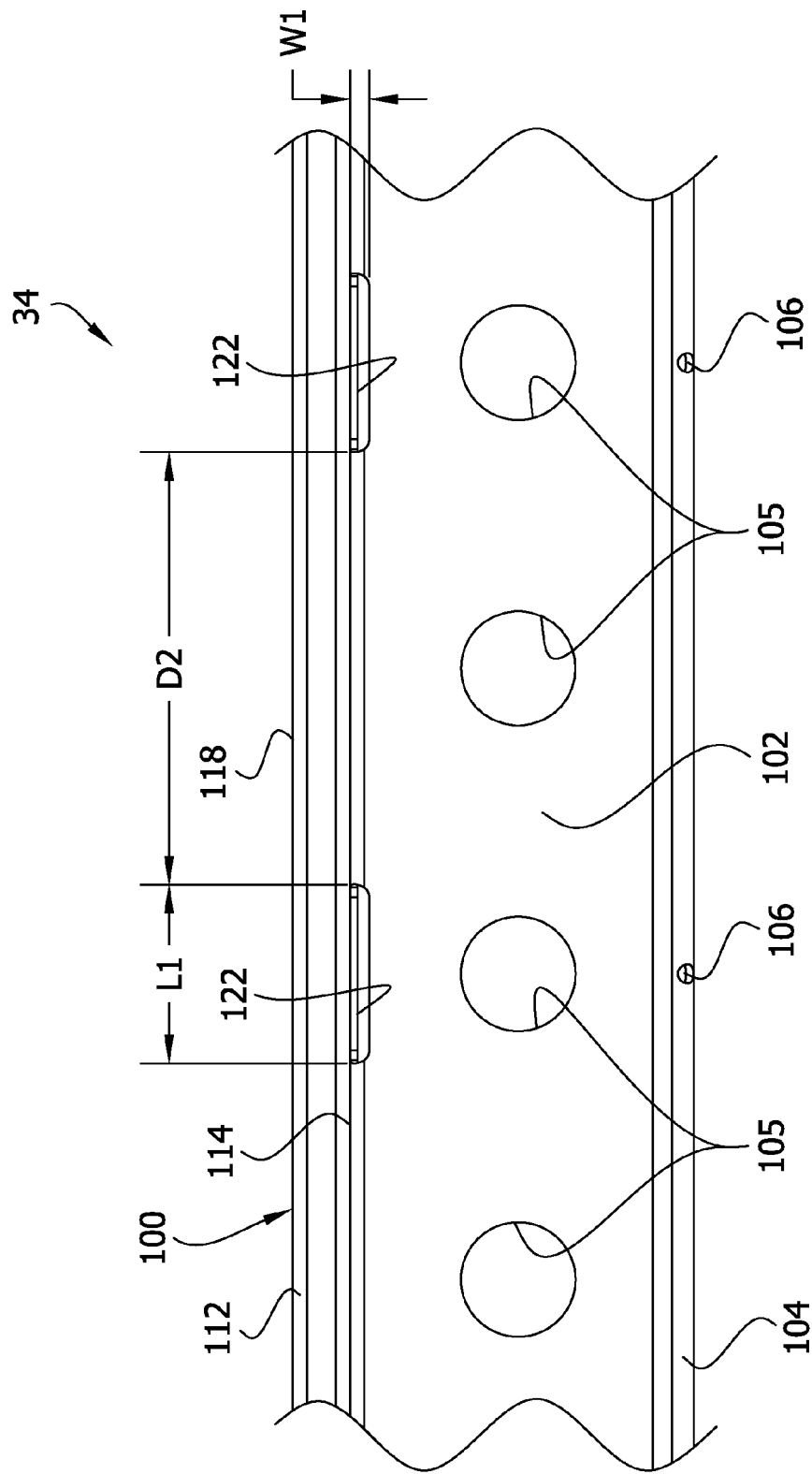
FIG. 11 is an enlarged, fragmentary front elevational view of the module rail.

Referring to FIGS. 9-11, the rail sidewalls 102 and the lower flanges 104 provide structural rigidity to the rails 34, to inhibit bending, and provide a suitable load capacity for the photovoltaic modules 12. Material is removed from the sidewalls 102, forming holes 105 (FIG. 11), to reduce the weight of the module rails 34. The holes 105 may also be used to run cables therethrough. In the illustrated embodiment, the lower flanges 104 are return flanges, which define flange channels. In one example, the return flanges 104 may be configured to receive cables for cable management purposes. Flange openings 106 in the bottoms of the return flanges 104, shown best in FIG. 10, allow liquid (e.g., rain and/or melted snow) to flow therethrough to inhibit pooling of liquid in the flange channels. The flange openings may also be used to run fasteners (e.g., tie fasteners, not shown) therethrough to secure the cables in the flange channels.

Figure 13:
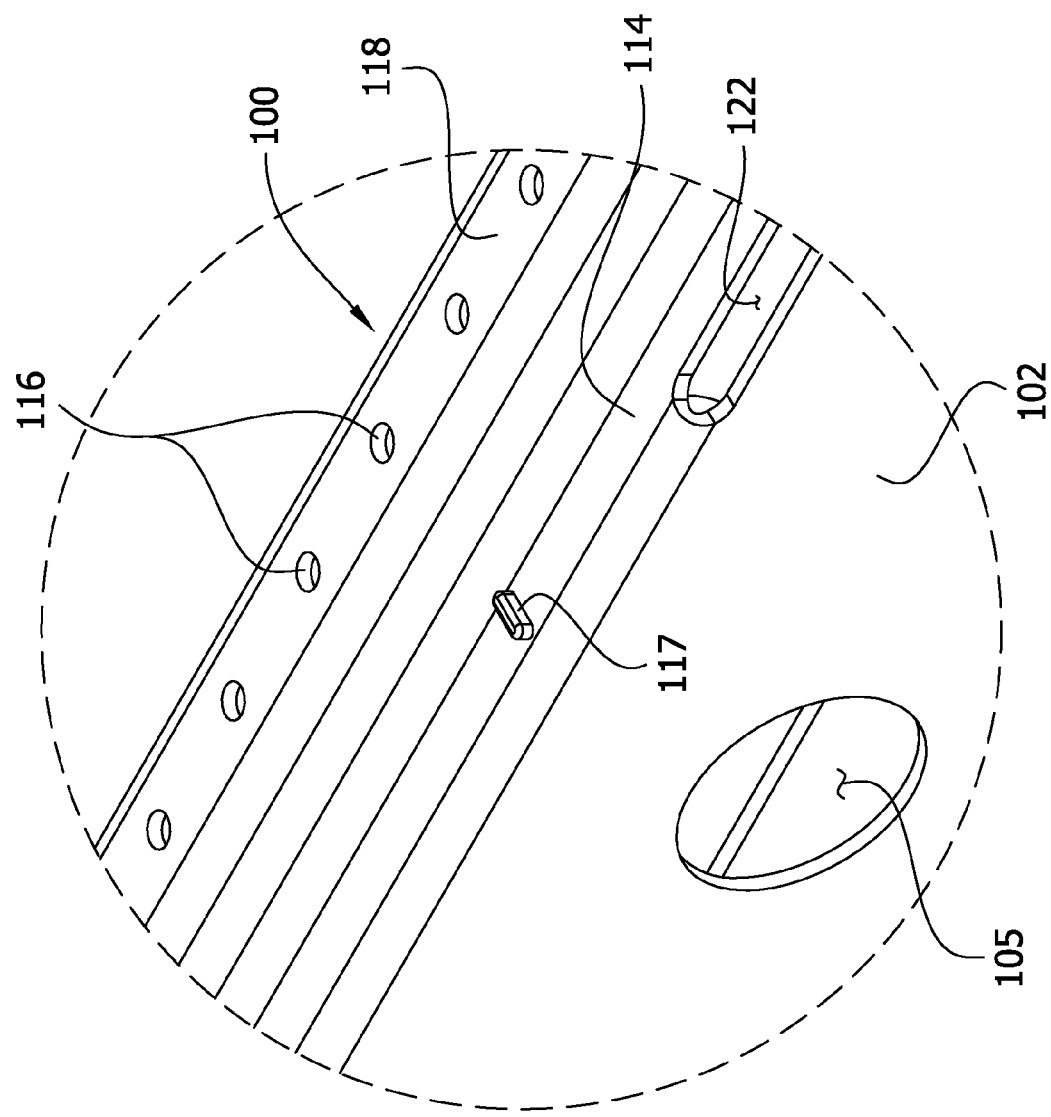
FIG. 13 is an enlarged view taken from FIG. 2, illustrating a locating indication on one of the module rails.
Figure 14:
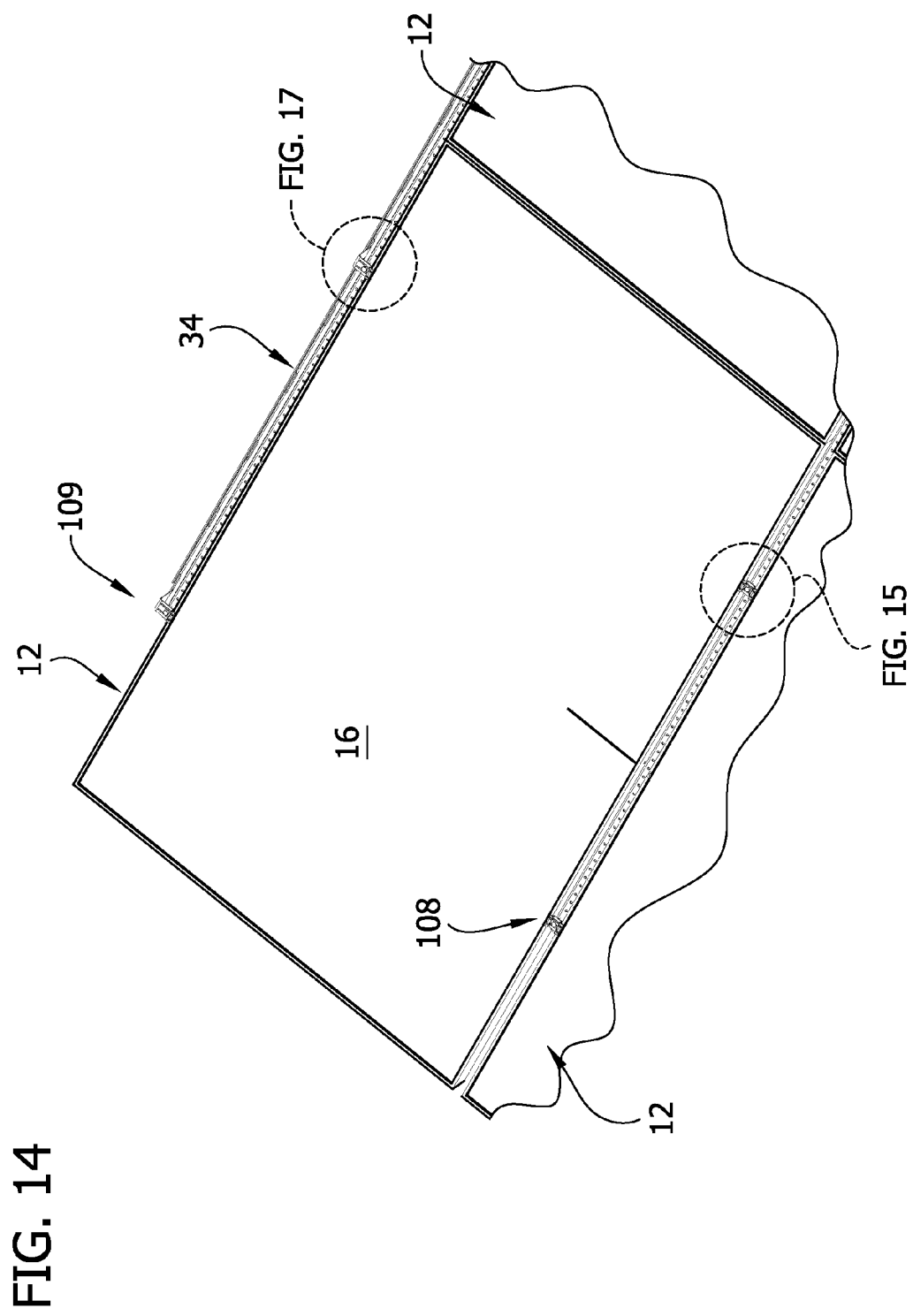
FIG. 14 is an enlarged view taken from FIG. 1, illustrating top-down fastener securing modules to the module rails.

As shown best in FIG. 9, the top-hat portion 100 of each rail 34 has an upper, inverted generally U-shaped portion 112 and opposite shoulders 114 (e.g., north and south shoulders) extending laterally outward from opposite lower ends of the inverted U-shaped portion. The top-hat shoulders 114 (broadly, module-supporting surfaces) provide support surfaces on which the lower flanges 24 of the module frames 18 are supported when the modules 12 generally abut the sidewalls of the inverted U-shaped portion. Accordingly, adjacent north and south modules 12 are spaced apart from one another, in the north-south direction, generally the width of the inverted U-shaped portion 112. As shown in FIG. 13, a locator 117, such as a bump or other raised structure, is provided on the shoulders 114 at mid-points along the length of the rails 34. The locator 117 allows a user to locate the middle modules 12 on the racking assembly 14, as explained below when disclosing a method of assembling the photovoltaic system 10.

Figure 12A:
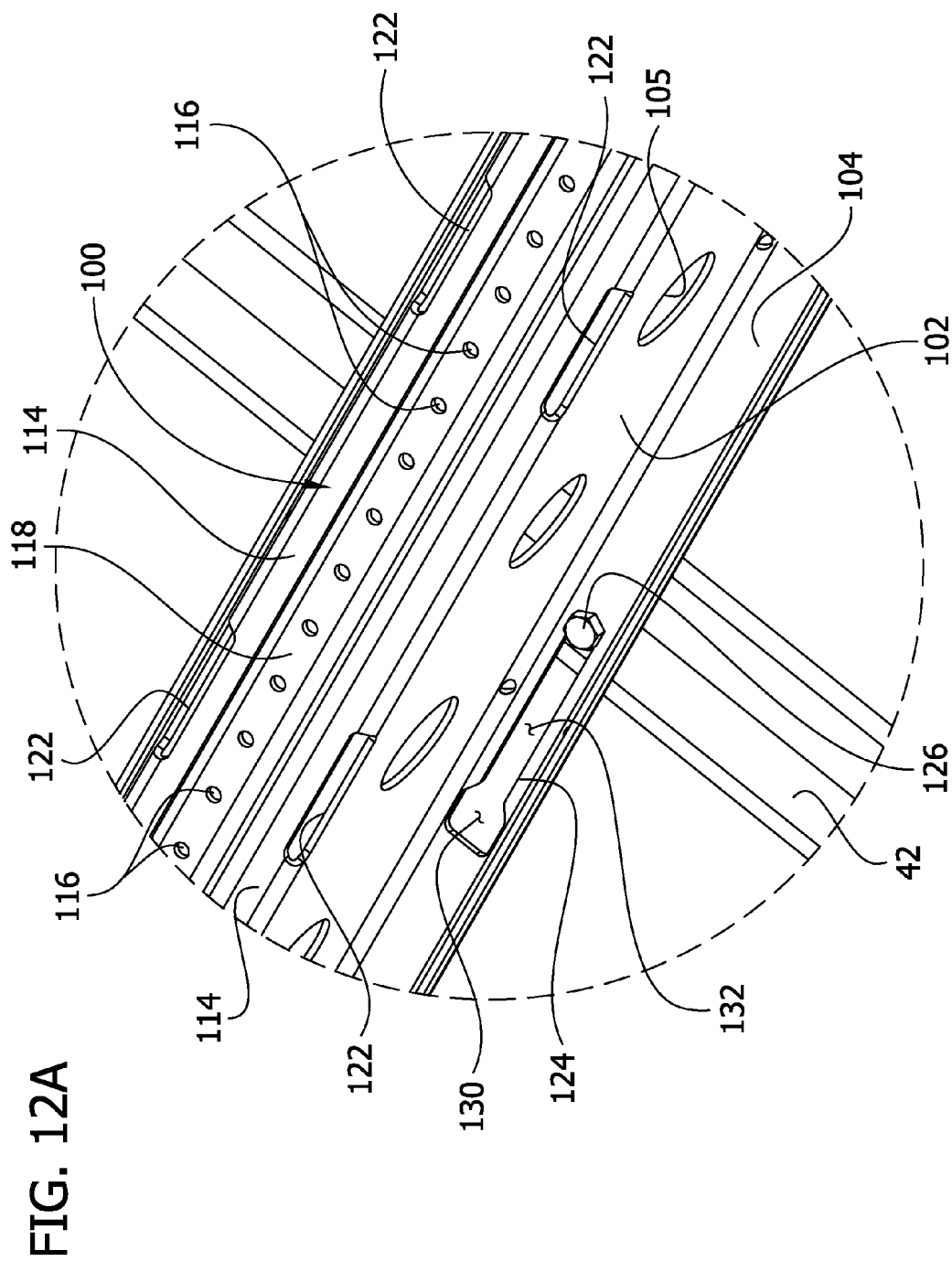
FIG. 12A is an enlarged view taken from FIG. 1, illustrating one of the module rails secured to one of the pier caps.

As shown best in FIGS. 10 and 12A, a plurality of top-down fastener openings 116 (broadly, a first set of openings) extend through a top 118 (broadly, an upper portion of the rail) of the inverted U-shaped portion of the top-hat portion 100. The inverted U-shaped portion also has opposing sides extending downward from opposite sides of the top 118. As explained in more detail below, the top-down fastener openings 116 are used for attaching the top-down fasteners 108, 109 to the rail 34 to secure the modules 12 to the rail. The top-down fastener openings 116 are spaced apart from one another along the length of the module rail a distance D1, which may measure from about ⅜ in (about 9.5 mm) to about 1.5 in (about 38.1 mm). Referring to FIGS. 10 and 11, each module rail 34 also has a plurality of clip fastener openings 122 (broadly, a second set of openings) generally adjacent to the junctures of the shoulders 114 and the respective sidewalls 102 of the rail. In the illustrated embodiment, each clip fastener opening 122 extends through portions of both the corresponding shoulder 114 and the sidewall 102, although the clip fastener openings may extend through one or the other of the shoulder and the sidewall. As explained in more detail below, the clip fastener openings 122 are configured to receive the clip fasteners 110 for securing the modules 12 to the module rails 34. The clip fastener openings 122 are generally slot-shaped, each having a length L1 extending along the length of the module rail 34, and width W1 extending from the shoulder 114 to the sidewall 102 of the rail 34. In one example, the length L1 of each clip fastener opening 122 may be from about 1.5 in (about 38.1 mm) to about 3.0 in (about 76.2 mm). Adjacent clip fastener openings 122 are spaced apart from one another a distance D2, measuring from about 8.0 in (about 20.3 cm) to about 12.0 in (about 30.5 cm). The clip fastener openings 122 may have other shapes and sizes and other locations without departing from the scope of the present invention. Moreover, the rails 34 may not include the clip fastener openings 122 without departing from the scope of the present invention.

Referring to FIG. 12A, in one embodiment the module rails 34 have rail fastener openings 124 in lower flanges 104 (broadly, in lower portions of the rails) that receive rail fasteners 126 on the respective pier caps 32 to secure the rails to the pier caps. In the illustrated embodiment, each rail fastener 126 is a thread cutting screw (only a head of the screw is visible in FIG. 12A, and is indicated by the same reference numeral 126) secured to the upper return flange 42 (broadly, rail support portion) of the pier cap 32. An upper portion of the thread cutting screw 126 extends above the upper return flange 42 so that the head of the screw and a portion of a shaft (not shown) are disposed above the upper return flange 42. Each rail fastener opening 124 has a keyhole shape for receiving the head of the screw 126 and the upper shaft portion therethrough. In particular, each rail fastener opening 124 has an enlarged clearance portion 130 having dimensions greater than dimensions of the head of the screw 126 so that the head can be inserted from below the rail up through the clearance portion. Each rail fastener opening 124 also has narrower slot-shaped portion 132 having a width less than the width of the head of the screw 126 and greater than the width of the upper shaft portion for inhibiting the head from withdrawing from the slot-shaped portion while allowing the shaft of the screw to slide along the slot-shaped portion. To secure the rail 34 to the pier caps 32, the rail is positioned on the upper return flanges 42 of the pier caps such that the head of the screws 126 on the pier caps extend through the clearance portions 130 of the respective rail fastener openings 124. The rail 34 is then slid across the pier caps 32 in the east-west direction so that the upper portions of the screw shafts enter the slot-shaped portions 132 of the respective rail fastener openings 124. The rail 34 is slid in the east-west direction until the screw shafts abut the rail at the opposite ends of the slot-shaped portions 132 of the rail fastener openings 124. The thread cutting screw 126 are then tightened down to firmly secure the rails 34 to the pier caps 32.

Figure 12B:
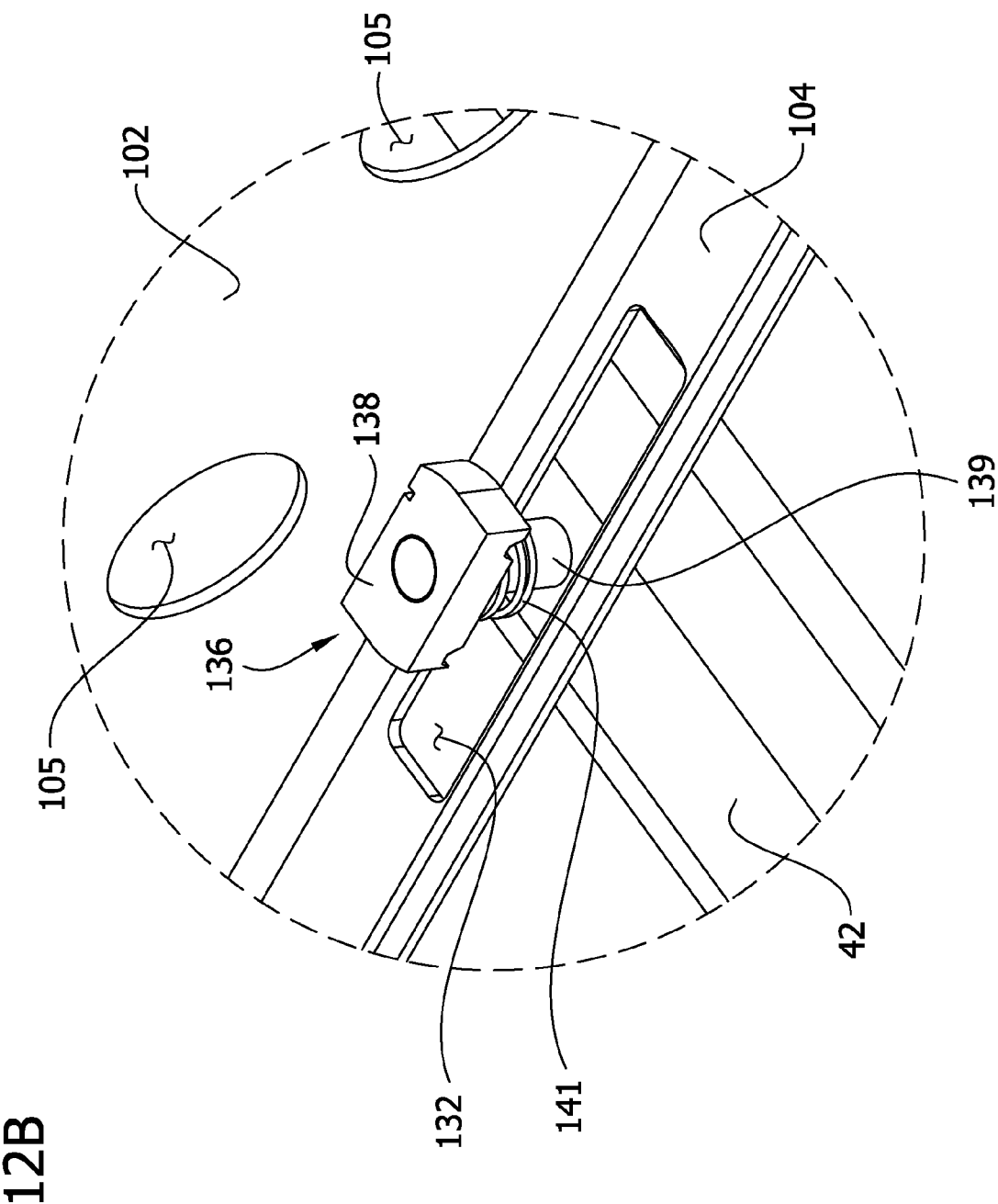
FIG. 12B is an enlarged view similar to FIG. 12A, except illustrating a second embodiment of a rail fastener in an unlocked position.
Figure 12C:
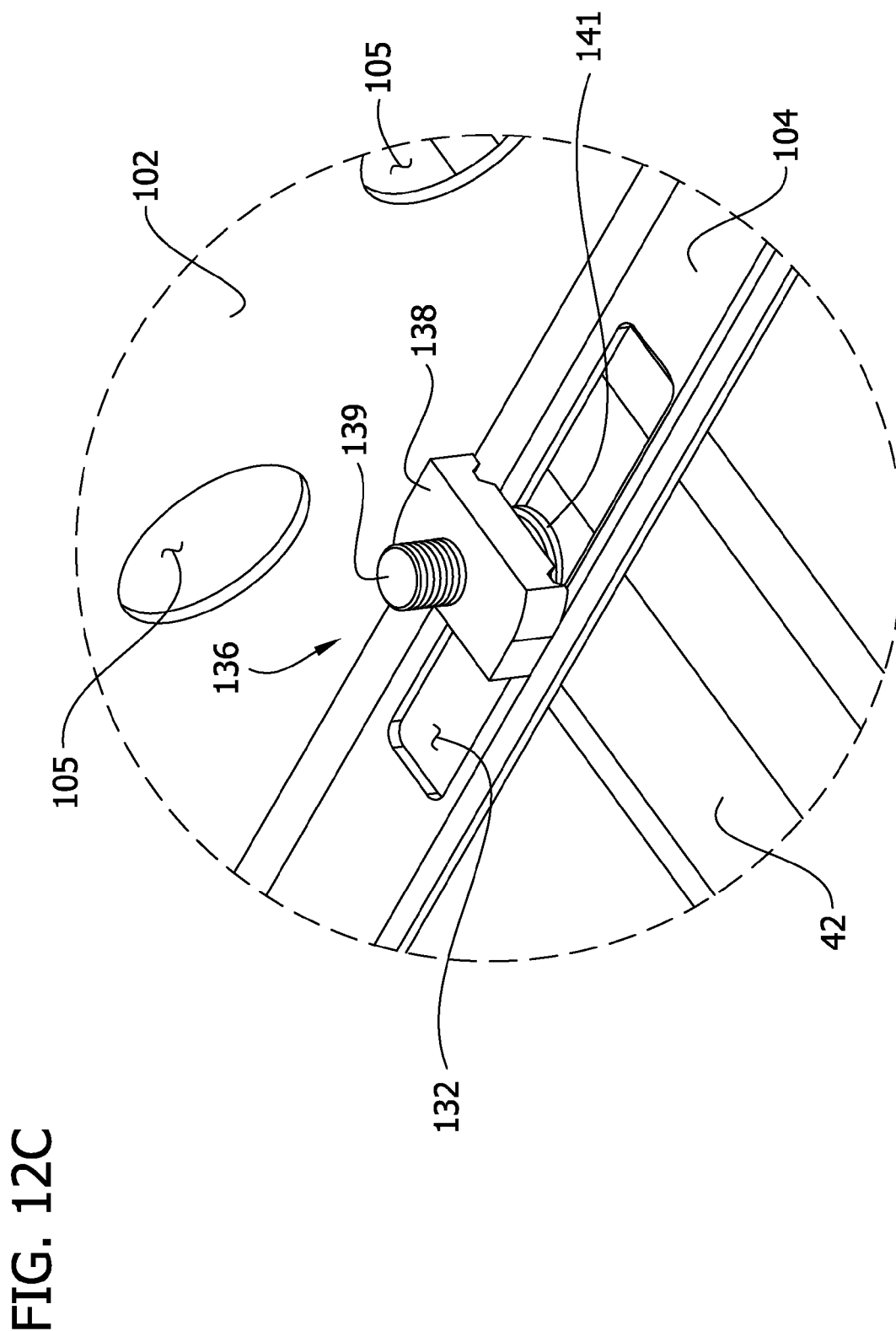
FIG. 12C is similar to FIG. 12B, except illustrating the rail fastener in a locked position and tightened to fixedly secure the rail to the pier cap.

The module rails may be secured to the pier caps in other ways. Referring to FIGS. 12B-12C, in one non-limiting example, the rail fastener, generally indicated at 136, is a twist lock fastener having an elongate channel nut 138 (broadly, a locking member) threaded on a shaft of a bolt 139 extending through a through hole in the upper return flange 42 (a head of the bolt—not shown—engages an underside of the upper return flange). The channel nut 138 is positionable between an unlocked position (FIG. 12B), in which the channel nut is insertable up through the rail fastener opening 140 from below and rotatable within the flange channel defined by the return flange 104, and a locked position, in which the channel nut is rotated a quarter turn from its unlocked position such that the channel nut extends cross-wise (i.e., generally transverse) with respect to the rail fastener opening 140 and the flange channel. When the channel nut 138 is in its locked position, it is inhibited from withdrawing from the fastener opening 140 and inhibited from further rotation (e.g., beyond a quarter turn) with respect to the flange 104, whereby the bolt 139 can be rotated from the underside of the flange 104 to tighten the channel nut on the rail 34 and secure the rail to the pier cap 32. In the illustrated embodiment, the channel nut 138 has opposite longitudinal ends each having diagonally opposite corners that are rounded or radiused to allow the fastener head to rotate a quarter turn within the channel flange, and diagonally opposite corners that engage the sidewall 102 and the return portion of the flange 104 (each of which define respective sides of the flange channel) to inhibit further rotation of the channel nut. The rail fastener 136 includes a spring 141 that urges the channel nut 138 and the bolt 139 upward relative to the upper flange 42 of the pier cap 32 so that the fastener head is received in the flange channel and above the bottom of the channel.

As disclosed above, the illustrated module rails 34 allow the photovoltaic modules 12 to be mounted thereon using the top-down fasteners 108, 109. In one embodiment, as shown in FIGS. 14-18, the first top-down fastener 108 is configured for mounting adjacent north and south modules 12 to a common rail 34, and the second top-down fastener 109 is configured for mounting north-end modules and south-end modules to the respective north and south rails. It is contemplated that racking assembly 14 may include a single, universal top-down fastener (not shown) for mounting all of the modules to the rails.

Figure 15:
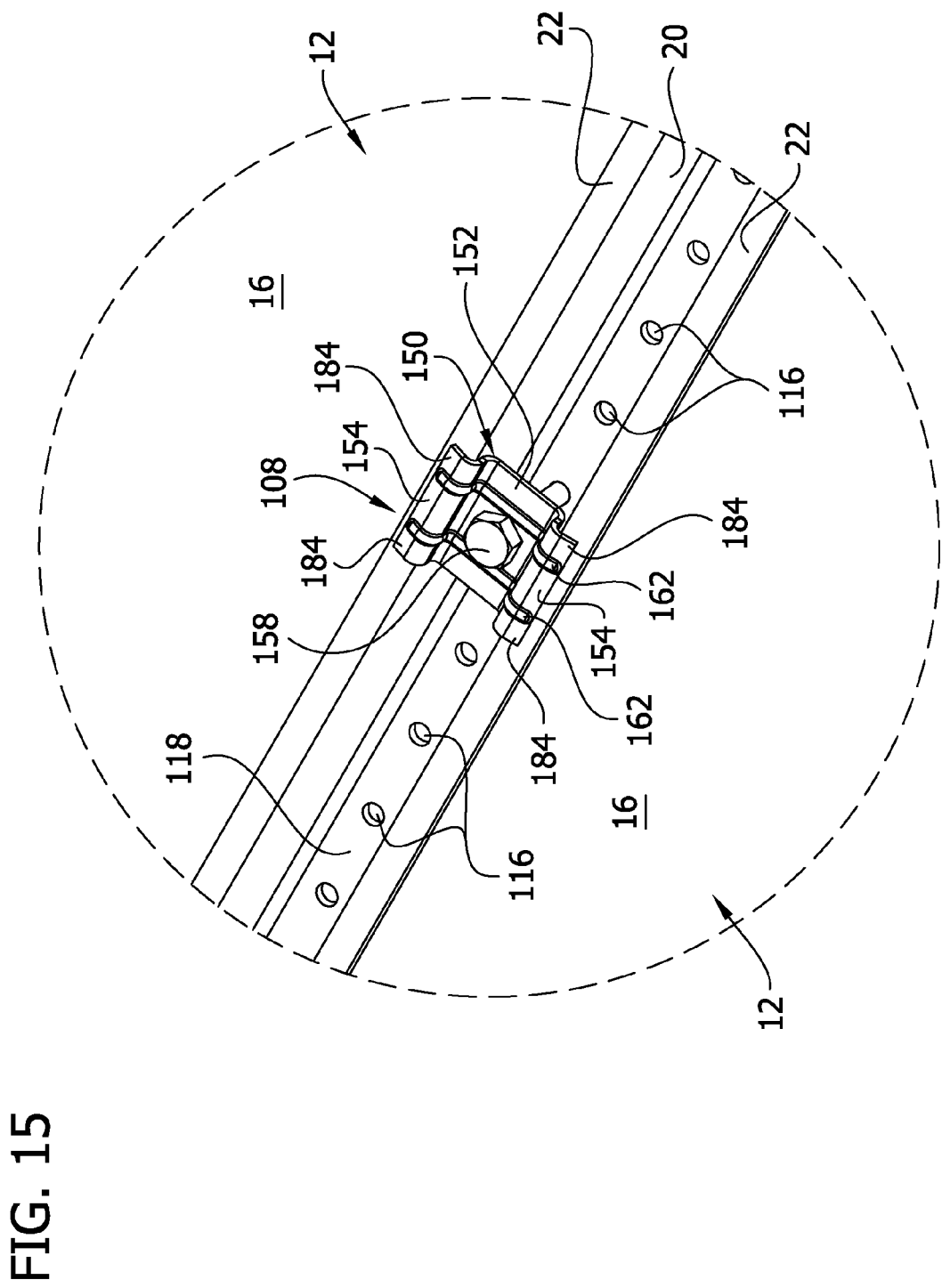
FIG. 15 is an enlarged view taken from FIG. 14, illustrating a first top-down fastener securing the modules to the module rails.
Figure 16:
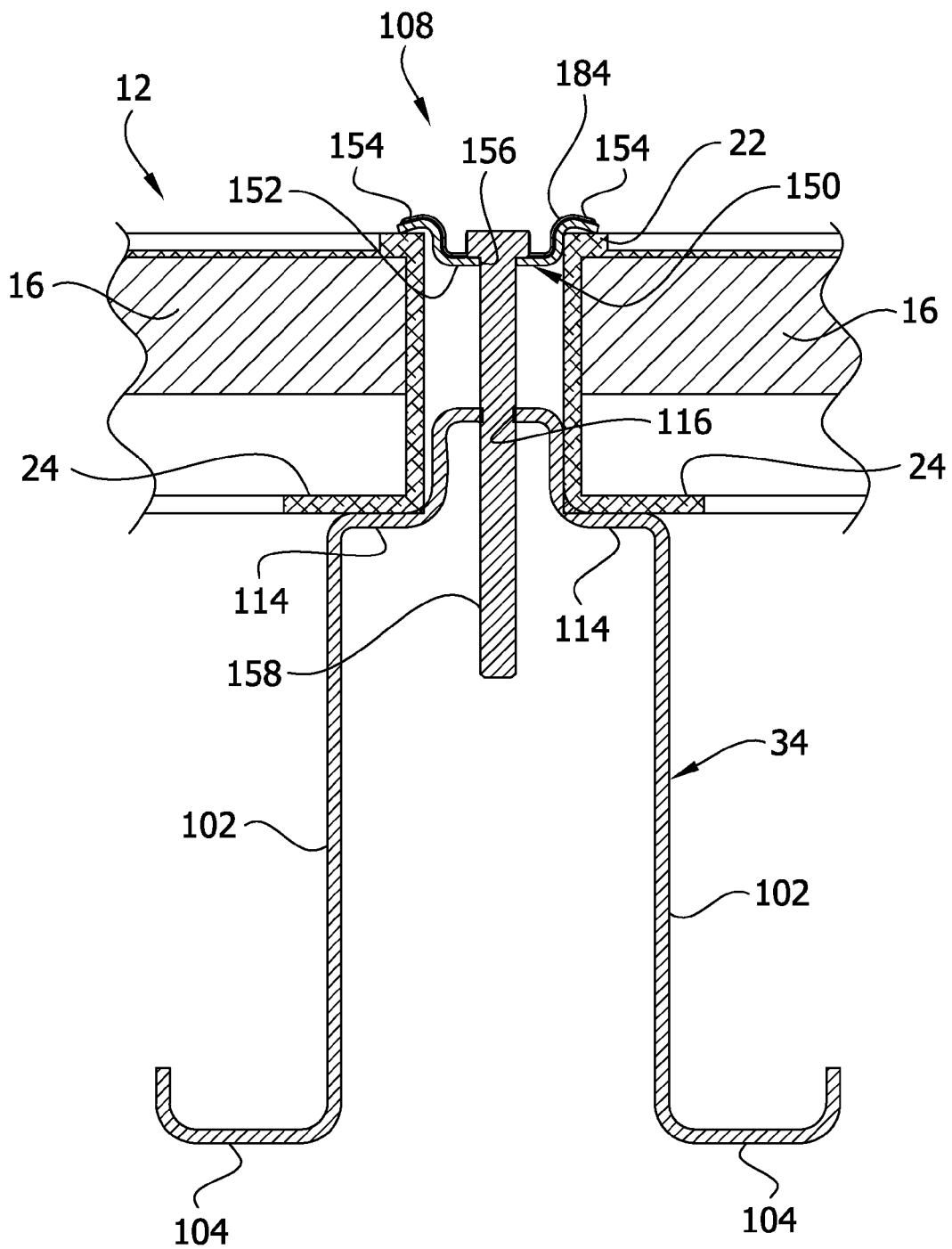
FIG. 16 is an enlarged, fragmentary cross section taken through the first top down fastener, the modules, and the module rail in FIG. 15.

Referring to FIGS. 15 and 16, the illustrated first top-down fastener 108 includes a body, generally indicated at 150, having a central U-shaped portion 152 sized and shaped to fit within space defined between the adjacent north and south modules 12 when the modules are resting on the shoulders 114 of the adjacent north and south rails 34. Opposite north and south engagement flanges 154 of the body 150 extends outward from opposite sides of the central U-shaped portion 152. A connector opening 156 in a base of the U-shaped portion 152 of the body is alignable with a single one of the top-down fastener openings 116 in the rail 34. A thread cutting screw 158 (broadly, a connector) of the top-down fastener 108 is insertable through the connector opening 156 in the U-shaped portion 152 and threaded through the aligned top-down fastener opening 116, which functions as a pilot hole for the thread cutting screw. In another embodiment, the top-down fastener may include a bolt and a nut, or other type of connector, instead of the thread cutting screw 158. The engagement flanges 154 on opposite north and south sides of the U-shaped portion 152 engage the upper flanges 22 of the respective module frames 18. Upon tightening of the screw 158 on the rail 34, the engagement flanges 154 clamp down on the respective north and south module frames 18 to hold the modules in place on the shoulders 114 of the rail 34. The body 150 of the illustrated first top-down fastener 108 includes ribs 162 extending between the opposite engagement flanges 154, and across the U-shaped portion 152, to provide structural rigidity to the body and inhibit bending of the body as the screw 158 is tightened and as the engagement flanges clamp down on the modules 12. The top-down fastener may be of other configurations, or the racking assembly 14 may not include the top-down fasteners, without departing from the scope of the present invention.

Figure 17:
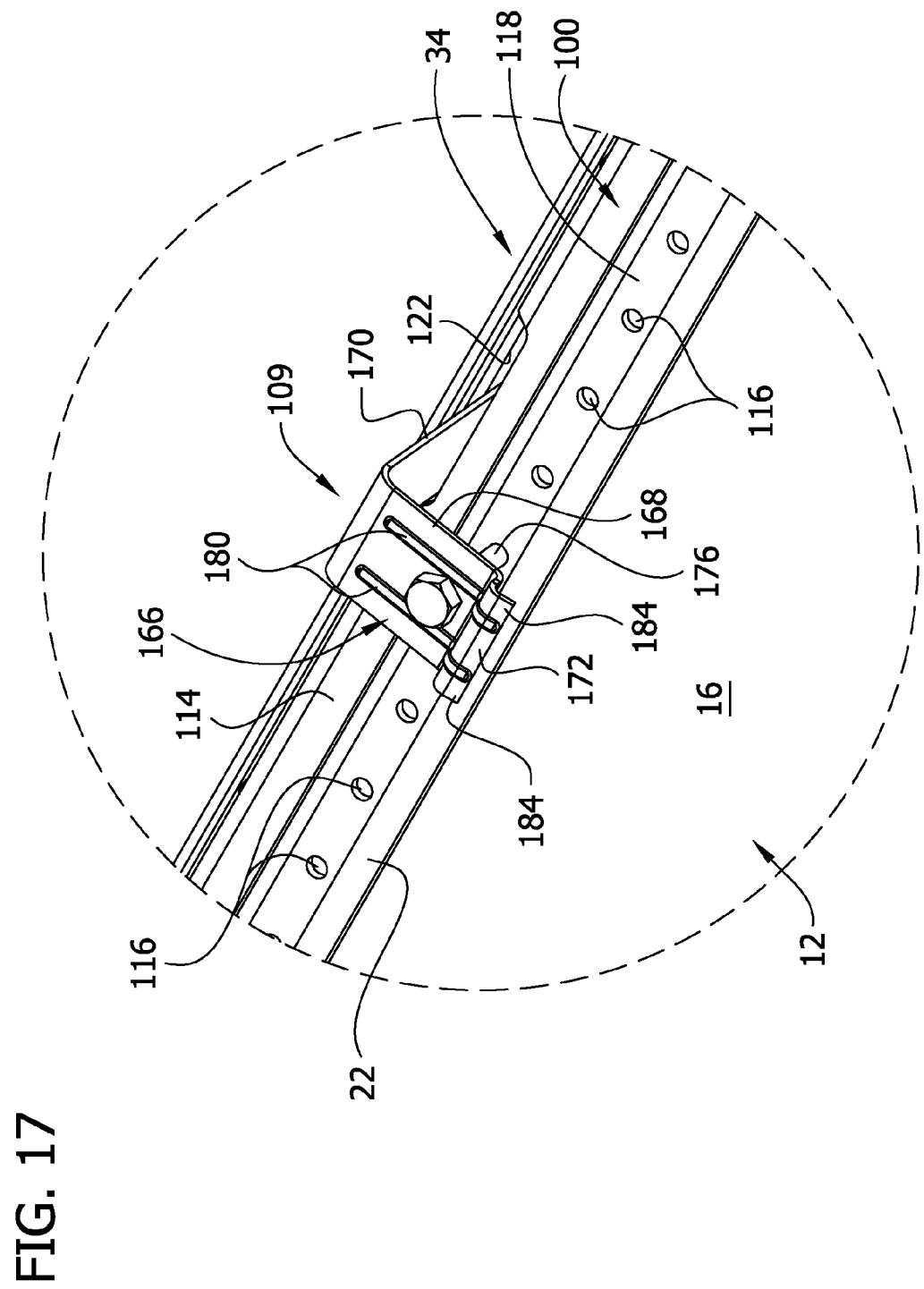
FIG. 17 is an enlarged view taken from FIG. 14, illustrating a second top-down fastener securing a module to the module rail.
Figure 18:
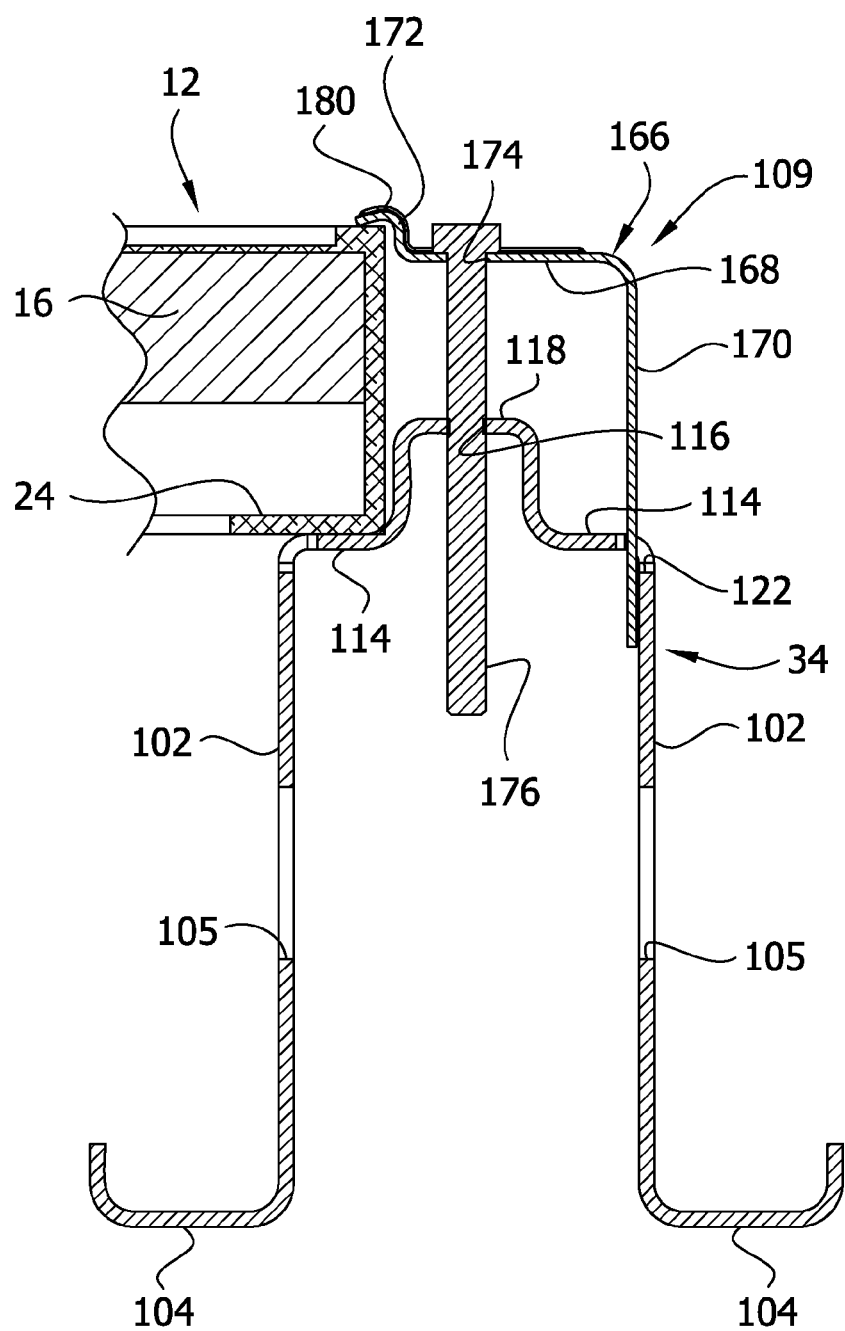
FIG. 18 is a cross section taken through the first top down fastener, the module, and the module rail in FIG. 17.
Figure 19:
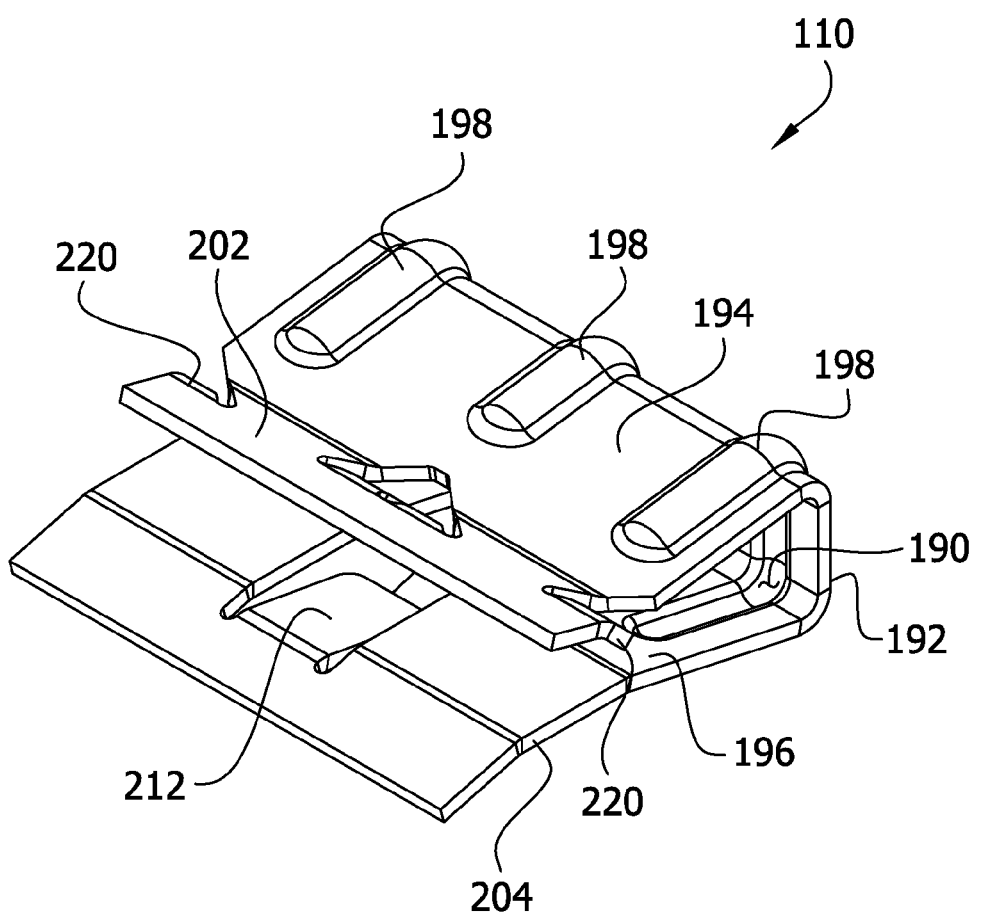
FIG. 19 is a top perspective of a clip fastener.
Figure 20:
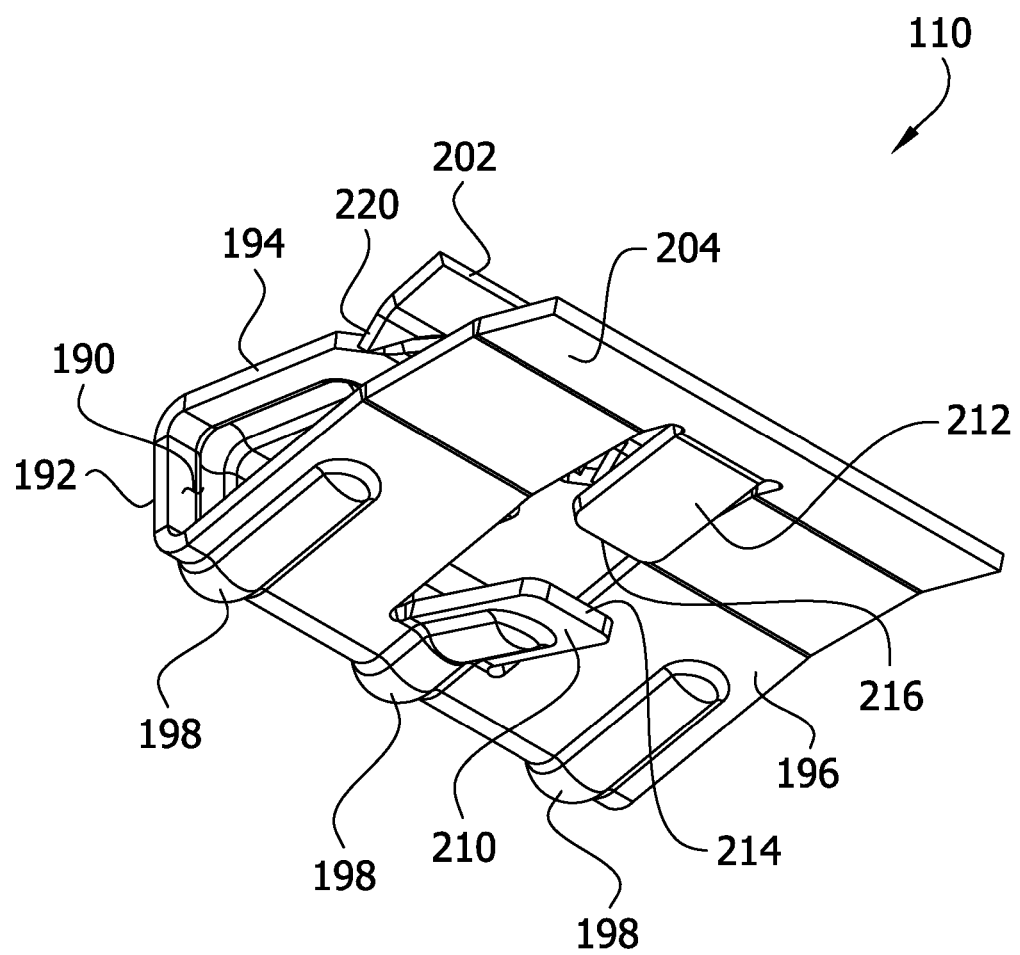
FIG. 20 a bottom perspective of the clip fastener.
Figure 21:
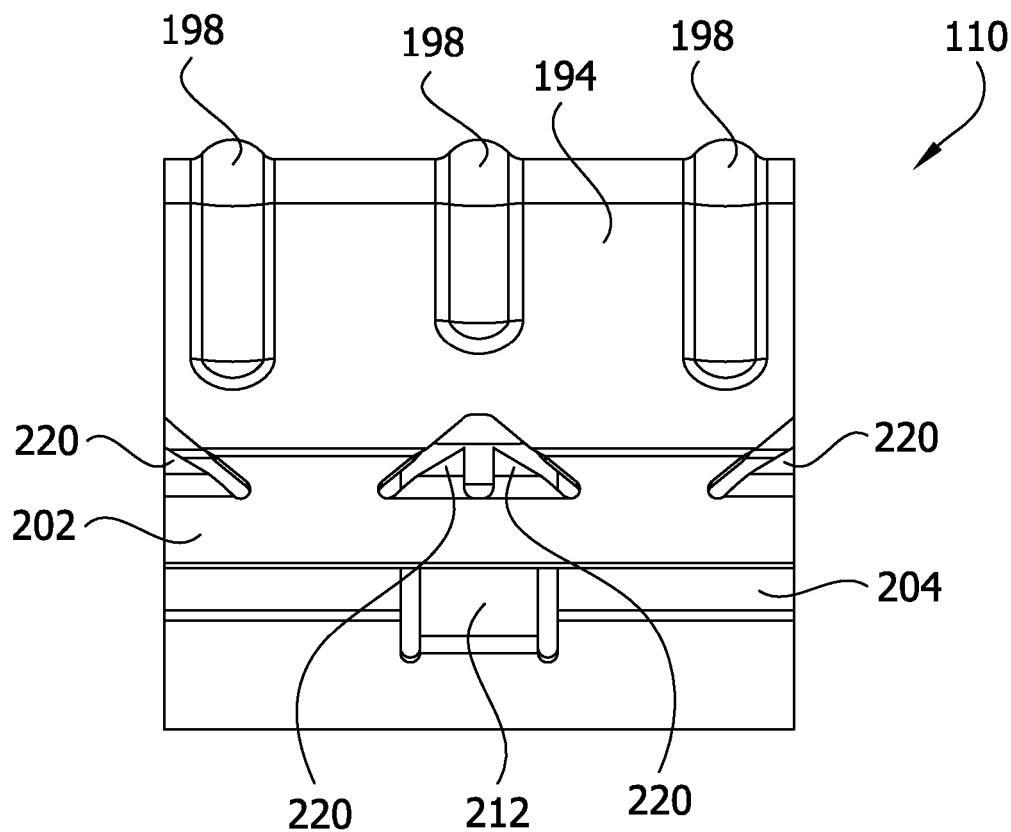
FIG. 21 is a top plan view of the clip fastener.
Figure 22:
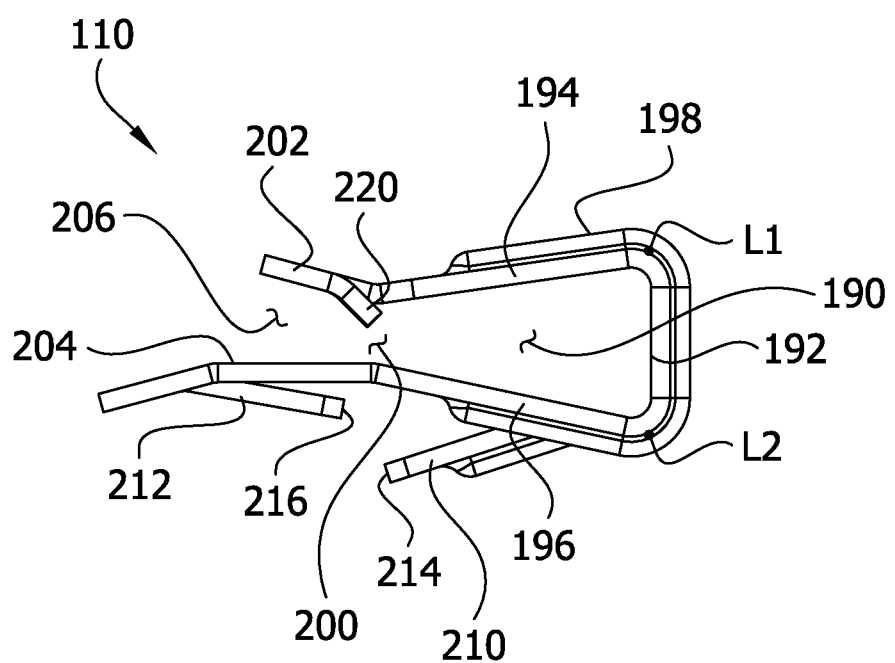
FIG. 22 is a side elevational view of the clip fastener.

As set forth above, the second top-down fastener 109 is configured for mounting north-end modules 12 and south-end modules to the respective north and south rails 34. Referring to FIGS. 17 and 18, the illustrated embodiment of the second top-down fastener 109 includes a body, generally indicated at 166, having a generally inverted L-shape. The body 166 has a central portion 168, a leg 170 extending downward from a first side of the central portion, and an engagement flange 172 extending upward and laterally outward from an opposite second side of the central portion. The second top-down fastener 109 is configured such that the engagement flange 172 engages the upper flange 22 of the module frame 18, and the leg 170 extends downward into the clip fastener opening 122 in the north (or south) rail 34. A connector opening 174 in the central portion 168 of the body 166 is aligned with a single one of the top-down fastener openings 116 in the rail 34. A thread cutting screw 176 (broadly, a connector) of the second top-down fastener 109 is insertable through the connector opening 174 in the central portion 168 and threaded into the aligned top-down fastener opening 116, which functions as a pilot hole for the thread cutting screw. In another embodiment, the top-down fastener may include a bolt and a nut, or other type of connector, instead of the thread cutting screw 176. Upon tightening the screw 176, the engagement flange 172 clamps down on the upper flange 22 of the module 12 to hold the module on the shoulder 114 of the rail 24. The depending leg 170, which is received in an aligned clip fastener opening 122, inhibits the second top-down fastener 109 from rotating relative to the rail 34 so that the engagement flange 172 is retained in engagement with the upper flange 22 of the module frame 18 as it is clamped down. The illustrated body 166 of the second top-down fastener 109 includes ribs 180 extending across the central portion 168 of the body to the engagement flange 172 to provide structural rigidity to the body and inhibit bending of the body as the screw 176 is tightened and as the engagement flange clamps down on the module 12. The second top-down fastener may be of other configurations, or the racking assembly 14 may not include the second top-down fasteners, without departing from the scope of the present invention.

In addition to clamping the modules 12 on the rails 34, in the illustrated embodiment the first and second top-down fasteners 108, 109, respectively, are configured to provide an electrical connection between the modules and the rails to facilitate electrically grounding of the modules. As described above, the module frames 18 have an outer, electrically non-conductive anodic layer covering the electrically conductive material (e.g., aluminum). To facilitate an electrical connection, each engagement flange 154, 172 of the first and second top-down fasteners 108, 109, respectively, includes one or more piercing members 184 that pierce (e.g., score, scrape, dig, and/or puncture) through the anodic, or other non-conductive outer layer, and make electrical contact with the electrically conductive material (e.g., aluminum) as the respective top-down fastener is clamped down. In the illustrated embodiment (FIGS. 15-18), the piercing members 184 comprise teeth (indicated by the same reference numeral 184) formed on (e.g., at the corners of) the respective engagement portions 154, 172. By way of example only, the teeth 184 are formed by bending the corners of the respective engagement portions 154, 172 slightly downward, at an angle less than about 30 degrees, such as from about 1 degree to about 10 degrees (e.g., 8 degrees), relative to the engagement flange. As the top-down fastener 108, 109 is clamped down by tightening the corresponding screw 158, 176, the teeth 184 contact the module frame(s) 18 and scrape or score (i.e., puncture) the anodic layer. Further clamping of the engagement flange(s) 154, 172 on the frame(s) 18 causes the teeth 184 to resiliently deflect upward slightly (i.e., flatten out) relative to the engagement flange(s), whereby the teeth continue to score the anodic layer, while being urged into contact with the electrically-conductive material, to increase the area of contact between the teeth and the electrically-conductive material. It is understood that the teeth or other piercing member may be formed in other ways and may be of other configurations without departing from the scope of the present invention.

In the embodiment where both of the top-down fasteners 108, 109 are configured for grounding, each fastener, including the teeth 184 and the screws 158, 176 thereof, are electrically conductive so as to define an electrical path from the electrically-conductive material of the module frames 18 to the rails 34, which are electrically grounded. The top-down fasteners 108, 109 are capable of electrically conducting current as required by UL 467 and/or UL2703, to effectively ground the modules 12 through the rails 34. In one non-limiting example, the top-down fasteners 108, 109 are constructed to have a current-carrying capacity of at least 750 amps for four seconds to satisfy the requirement of UL 467. In another non-limiting example, the top-down fasteners 108, 109 may be wired in series with an applicable fuse (e.g., a 60 amp fuse) and connected to a 5,000 amp source. In this example, the top-down fasteners 108, 109 have a current-carrying capacity of at least 135% current (e.g., 81 amperes, where the fuse is a 60 am fuse) for sixty minutes and at least 200% current (e.g., 120 amperes, where the fuse is a 60 am fuse) for four minutes. It is understood that the top-down fasteners 108, 109 may have other current-carrying capacities without departing from the scope of the present invention. Each of the first and second top-down fasteners 108, 109 may be fabricated from a single sheet of metal, such as stainless steel (e.g., heat treated stainless steel) or steel having an electrically conductive and anti-corrosive coating, such as a zinc coating. Other ways of constructed the first and second top-down fasteners 108, 109 do not depart from the scope of the present invention. It is understood that only one of the first and second top-down fasteners 108, 109, or neither of the first and second top-down fasteners, may be capable of piercing the anodic layer, or other electrically non-conductive outer layer, of the module frames 18 to facilitate grounding of the modules 12.

Figure 23:
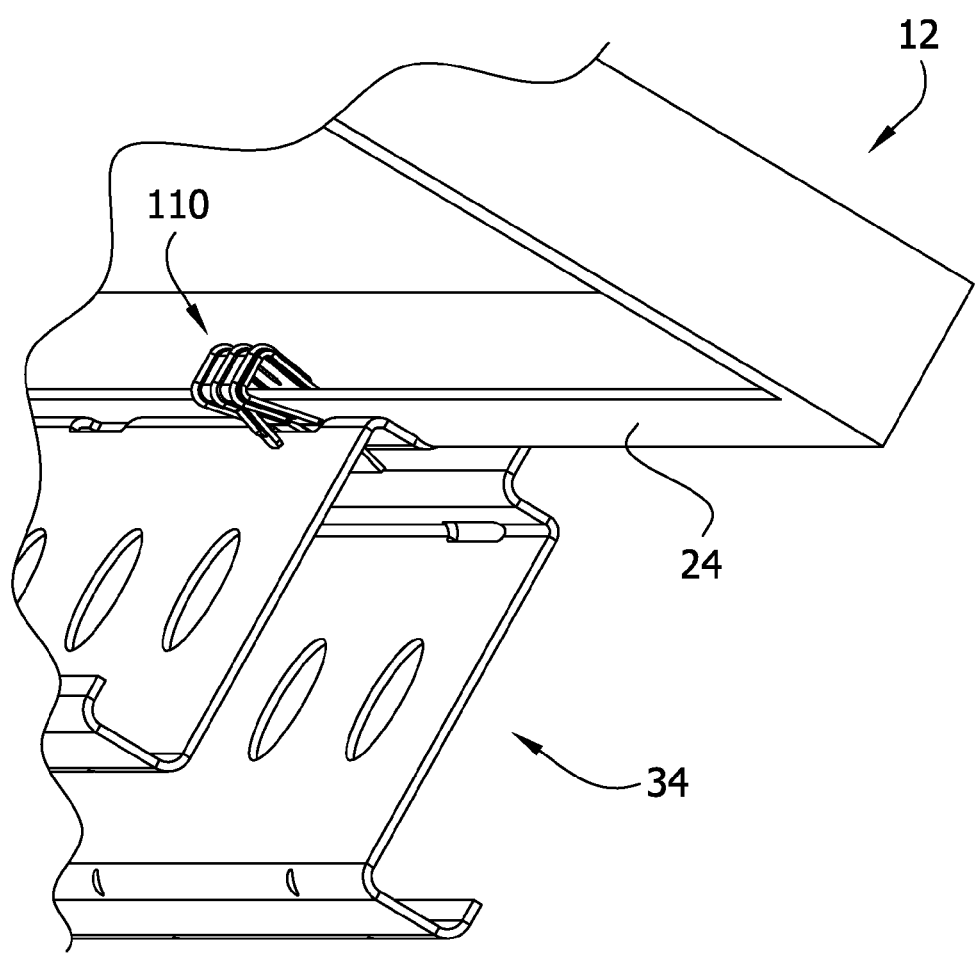
FIG. 23 is an enlarged, fragmentary view of an underside of one of the modules, showing the clip fastener securing the module to the module rail.
Figure 24:
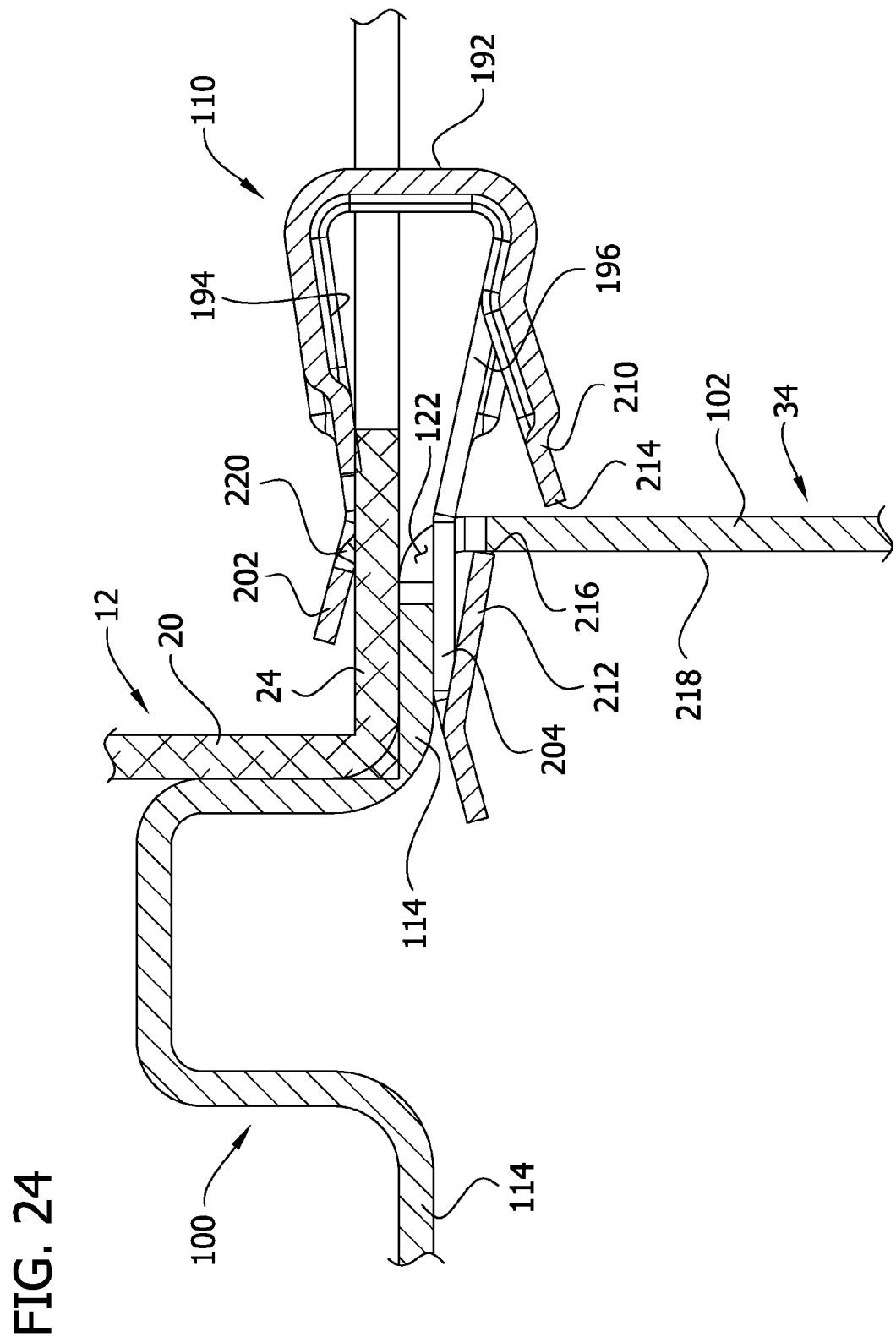
FIG. 24 is an enlarged, fragmentary cross section taken through the module, clip fastener, and the rail in FIG. 23.

Referring to FIGS. 19-24, the clip fasteners 110 are configured for underside mounting of the modules 12 to the rails 34, as shown best in FIGS. 23 and 24. As disclosed above, the shoulders 114 (broadly, module support portions) of the rails 34 are configured to support at least portions of the lower flanges 24 of the module frames 18. The illustrated clip fasteners 110 are configured for securing (e.g., clipping or clamping) the modules 12 on the shoulders 114 of the module rails 34. In particular, each clip fastener 110 defines a press-fit channel 190 in which the lower flange 24 of the module frame 18 and the shoulder 114 of the module rail 34 are press fit (FIGS. 23 and 24) to secure the module 12 to the rail 34. The illustrated clip fastener 110 includes a channel base (or loop) 192 and opposing upper and lower clip jaws 194, 196 (broadly, first and second clip jaws) extending from the channel base 192 to define the press-fit channel 190. It is understood that one or both of the upper and lower clip jaws 194, 196, as with the illustrated embodiment, may have openings therethrough, whereby the press-fit channel 190 is discontinuous across the clip fastener 110. The clip fastener 110 is configured to be pressed on the lower flange 24 and the shoulder 114 so that the upper clip jaw 194 engages the lower flange 24 of the module frame 18, and the lower clip jaw 196 extends through a selected one of the clip fastener openings 122 in the rail 34 and engages the underside of the shoulder 114. This clip fastener may be referred to as a "hammer-on" fastener, although a hammer is not necessarily used to press the clip 110 on the lower flange 24 and the shoulder 114.

In the illustrated embodiment, each clip fastener 110 is a spring clip fastener, whereby at least one of upper and lower clip jaws 194, 196 is resiliently deflectable away from the other clip jaw as the fastener is pressed on the lower flange 24 and the shoulder 114. The illustrated clip fastener 110 includes ribs 198 extending along the fastener from the upper clip jaw 194 to the lower clip jaw 196 to provide structural rigidity to the clip jaws and inhibit bending, and to increase the spring force exerted by the spring clip. In the illustrated embodiment, the clip jaws 194, 196 extend toward one another from the channel base 192 such that the channel base and the clip jaws have a generally triangular or tapered profile. A throat 200 of the press-fit channel 190 is defined generally at the apex of the triangular or tapered profile (i.e., the location where the clip jaws are the least distance apart from one another). The upper clip jaw 194 is resiliently deflectable about an upper bend line L1 adjacent the juncture of the channel base 192 and the upper clip jaw, and the lower clip jaw 196 is resiliently deflectable about a lower bend line L2 adjacent the juncture between the channel base and the lower clip jaw. When the clip fastener 110 is secured to the lower flange 24 and the shoulder 114 (FIGS. 23 and 24), tension at the bend lines L1, L2 urges the clip jaws 194, 196 toward the lower flange 24 and the shoulder 114, thereby squeezing or compressing together the lower flange and the shoulder to firmly secure the module 12 to the rail 34. Terminal end margins 202, 204 (or lips) of the respective upper and lower clip jaws 194, 196 flare outward, at locations adjacent to the throat 200, to define an enlarged entrance 206 of the press-fit channel 190 that facilitates insertion of the lower flange 24 and the shoulder 114 into the press-fit channel. The clip fastener 110 may be of other configurations without departing from the scope of the present invention.

In one embodiment, the clip fasteners 110 are configured to resist lift produced by wind forces acting on the modules 12. The clip fasteners 110 may be configured to resist lift forces that are from about 25 lbs/ft$^2$ (1197 N/m$^2$) to about 30 lbs/ft$^2$ (1436 N/m$^2$) or as much as 50 lbs/ft$^2$ (2394 N/m$^2$) to about 70 lbs/ft$^2$ (3352 N/m$^2$). In one example, the modules 12 may be 18 ft$^2$ (1.7 m$^2$), and four clip fasteners 110 may be used to secure each of the modules to the rails 34. Thus, where the photovoltaic system 10 is rated to resist lift forces of 30 lbs/ft$^2$ (1436 N/m$^2$), each clip fasteners 110 may be configured to hold at least about 135 lbs (601 N). Thus, for each clip fastener 110 an install deflection of the clip fastener multiplied by a spring constant of the clip fastener must be greater than or equal to 135 lbs (601 N). In one example, the distance between the jaws 194, 196 at the throat 200 of each clip fastener 110 is about 0.070 in (0.18 cm). The thinnest stack of material the clip fastener may be installed on may be fourteen gauge steel (East-West Rail) with a 0.080 in (0.20 cm) thick solar module flange on it. Thus, the clamp will open at least an additional 0.080 in (0.20 cm), i.e., the jaws 194, 196 will deflect at least a distance of about 0.080 in (0.20 cm), when installed. So, the clip fastener 110 may have a suitable minimum spring constant of about 135 lbs/0.080 in (601 N/0.20 cm) or about 1688 lb/in (191 N/m). It is envisioned that the clip fasteners may have a minimum spring constant of from about 1400 lb/in (158 N/m) to about 2000 lb/in (226 N/m), preferably from about 1500 lb/in (169 N/m) to about 1900 lb/in (215 N/m). The clip fastener 110 may be constructed to have a spring constant other than set forth above without departing from the scope of the present invention.

The illustrated clip fastener 110 includes a depth stop 210 and withdrawal stop 212 on the lower clip jaw 196. The depth stop 210 and the withdrawal stop 212 facilitate proper positioning and retention of the clip fastener 110 on the lower flange 24 and the shoulder 114. In particular, once the clip fastener 110 is properly positioned on the lower flange 24 and the shoulder 114, as shown in FIGS. 23 and 24, the illustrated depth stop 210 inhibits further advancement of the clip fastener relative to the lower flange 24 and the shoulder 114, and the withdrawal stop 212 inhibits withdrawal of the clip fastener away from the lower flange and the shoulder. In the illustrated embodiment, the depth stop 210 and the withdrawal stop 212 facilitate positioning of the clip fastener 110 such that upper clip jaw 194 engages a portion of the lower flange 24 that extends past the shoulder 114, and only the terminal end margin 204 of the lower clip jaw 196 engages underside of the shoulder 114. As shown in FIG. 24, the teeth 220 engage the lower flange 24 at a location that is directly above the lower clip opening 122. This position of the clip fastener 110 will be attained regardless of the size and shape of the lower flange 24, as long as the longer flange has a length that is not greater than the depth of the press-fit channel 190.

The illustrated depth stop 210 is generally in the form of a tab angling downward from the lower clip jaw 196 away from to the channel base 192 and generally toward the throat 200. A terminal end 214 of the depth stop 210 is located a suitable distance below the lower clip jaw 196 such that, in use, the terminal end of the tab contacts the exterior surface of rail sidewall 102 below the corresponding clip fastener opening 122. Thus, the depth stop 210 is configured to restrict the amount the lower clip jaw 196 is insertable into the clip fastener opening 122 by being configured to contact the rail sidewall 102 and inhibits further advancement of the clip fastener 110 relative to the lower flange 24 and the shoulder 114 when the clip fastener is properly located on the shoulder and the lower flange. In this way, the depth stop 210 facilitates proper placement of clip fastener 110, independent of the length of the lower flange, and without having to estimate or otherwise determine whether the clip fastener is properly securing the module 12 to the rail 34. Other ways of properly positioning the clip fastener 110 on the lower flange 24 and shoulder 114 do not depart from the scope of the present invention. Moreover, the clip fastener 110 may not include a depth stop without departing from the scope of the present invention.

The withdrawal stop 212 is generally in the form of a tab angling downward from adjacent the terminal end margin 204 of the lower clip jaw 196 and generally toward the throat 200. A terminal end 216 of the withdrawal stop 212 is located a suitable distance below the lower clip jaw 196 such that when the clip fastener 110 is properly securing the module 12 to the rail 34, the terminal end of the withdrawal stop is adjacent to the interior surface 218 of the rail sidewall 102 below the clip fastener opening 122, and the terminal end of the withdrawal stop contacts the interior surface when attempting to withdrawal the lower clip jaw from the clip fastener opening. When pressing on the clip fastener 110, such as by hammering on, the lower clip jaw 196 enters the clip fastener opening 122 in the rail 34, and the withdrawal stop 212 resiliently deflects toward the lower clip jaw 196 and enters the clip fastener opening 122. After the terminal end 216 of the withdrawal stop 212 passes through the clip fastener opening 122, the withdrawal stop rebounds to its original configuration to inhibit unintentional disengagement of the clip fastener 110 from the lower flange 24 and the rail 34. It is envisioned that a tool, such as a screw driver, may be used to resiliently deflect the withdrawal stop 212 toward the lower clip jaw 196 so that the lower clip jaw 196 may be withdrawn from the clip fastener opening 122.

In addition to securing the modules 12 on the rails 34, the illustrated spring clip fastener 110 is configured to provide an electrical connection between the modules and the rails to facilitate grounding of the modules. It is understood that in at least one embodiment the clip fastener may not be capable of providing an electrical connection between the modules and the rails, but instead, the clip fastener is used solely to secure the modules to the rails. Also, in at least one other embodiment, the clip fastener may not be capable of adequately securing the modules to the rails, but instead the clip fastener may be used solely for the purpose of electrically connected the module to the racking system to ground the module.

As set forth above, the module frames 18 have a electrically non-conductive anodic layer covering the electrically conductive material. Accordingly, the upper clip jaw 194 of the spring clip fastener 110 includes one or more piercing members 220 that pierce through (e.g., score, scrape, dig, and/or puncture) the anodic layer, or other electrically non-conductive outer layer, and make electrical contact with the electrically conductive material (e.g., aluminum) as the lower flange 24 of the module frame 18 is press-fit in the press-fit channel 190. In the illustrated embodiment, the piercing members 220 comprise teeth (indicated by the same reference numeral 220) formed adjacent opposite sides of the upper clip jaw 194 and at intermediate locations between the opposite sides. The teeth 220 extend slightly downward from the terminal end margin 202 of the upper clip jaw 202 and into, or generally adjacent to, the throat 200 of the press-fit channel 190. It is understood that the teeth 220 may extend into another portion of the press-fit channel 190 other than the throat 200. The teeth 220 may extend at an angle from about 15 degrees to about 45 degrees relative to the terminal end margin 202 of the upper clip jaw 194. As the clip fastener 100 is pressed on, hammered on, or otherwise press fit on the lower flange 24 and the rail 34, the teeth 220 engage the lower flange 24 and score or scrap (i.e., puncture) the anodic layer and contact the electrically-conductive material. Initially, the teeth 220 may extend at an angle from about 30 degrees to about 60 degrees, preferably about 45 degrees, relative to the upper surface of the shoulder 114 such that the teeth dig or plow through the anodized layer on the lower flange 24. Further press fitting of the clip fastener 110 on the lower flange 24 may cause the teeth 220 to resiliently deflect upward (i.e., flatten out) relative to the terminal end margin 202 of the upper clip jaw 194, whereby the teeth continue to score the anodized layer, while being urged into contact with the electrically-conductive material, to increase the area of contact between the teeth and the electrically-conductive material.

The clip fasteners 110, including the teeth 220, are electrically conductive so as to define an electrical path from the electrically-conductive material of the module frames 18 to the modules rails 34, which are grounded. The clip fasteners 110 are capable of electrically conducting current as required by UL 467 and/or UL2703, to effectively ground the modules through the rails. In particular, the clip fasteners 110 have a current-carrying capacity of at least 750 amps for four seconds. In one non-limiting example, the clip fasteners 110 are constructed to have a current-carrying capacity of at least 750 amps for four seconds to satisfy the requirement of UL 467. In another non-limiting example, the clip fasteners 110 may be wired in series with an applicable fuse (e.g., a 60 amp fuse) and connected to a 5,000 amp source. In this example, the clip fasteners 110 have a current-carrying capacity of at least 135% current (e.g., 81 amperes, where the fuse is a 60 am fuse) for sixty minutes and at least 200% current (e.g., 120 amperes, where the fuse is a 60 am fuse) for four minutes. It is understood that the clip fasteners 110 may have other current-carrying capacities without departing from the scope of the present invention. The clip fasteners 110 may be fabricated from a single sheet of metal, such as spring steel. In such an embodiment, the single sheet of metal may be bent to form the upper and lower clip jaws 194, 196, respectively, and the sheet may be lanced to form the depth and withdrawal stops 210, 212, respectively, and the teeth 220. Other ways of making the first and second top-down fasteners do not depart from the scope of the present invention.

In one embodiment of a method of assembling the photovoltaic system 10 illustrated in FIG. 1, the piers 28, 30 are secured in the ground, such as by cement or by driving the piers into the ground. Next, the pre-assembled pier caps 32, each of which includes the hanger hooks 52 and the pier clamp(s) 54, 56, are placed on the piers 28, 30 by hanging the hanger hooks on the upper ends of the respective piers. In one example, the pier clamp(s) 54, 56 can be loosened and slid downward over the upper end of the pier 28, 30 until the upper hanger hooks 52 engage the upper end of the pier. In another example, the pier clamp(s) 54, 56 can be loosened and/or positioned so that the hanger hooks 52 engage the upper end of the pier 28, 30 without the pier clamp(s) engaging the pier, and then the pier clamp(s) can be positioned to loosely engage the pier.

With the pier caps 32 hanging on (i.e., loosely engaging) the piers 28, 30, each module rail 34 is individually secured to the pier caps. In one example, the rails 34 are secured to the pier caps 32 by placing each rail on the upper flanges 42 of the pier caps so that the respective rail fasteners 126 on the pier caps enter the clearance portions 130 of the respective rail fastener openings 124 in the rail 34. With the rail fasteners 126 in the respective clearance portions 130, the rail 34 is slid across the piers caps 32 until the rail fasteners engage the rail at the end of the slot-shaped portions 132 of the rail fastener openings 124. The rail fasteners 126 are then tightened to firmly secure the rail 34 to the pier caps 32. In the example where the rail fasteners are twist locks 136, the twist lock heads 138 are inserted into the rail fastener openings 140, and then rotated from their unlocked positions to their locked positions to firmly secure the rail to the pier caps.

After firmly securing all of the rails 34 to the pier caps 32, the pier caps can be firmly secured to the piers 28, 30, such as by tightening the pier clamp(s) 54, 56 on the respective piers. This method of first loosely securing the pier caps 32 to the piers 28, 30 and then firmly securing the pier caps to the piers after firmly securing all of the rails 34 to the pier caps, quickly and easily squares the racking assembly 14 without having to take measurements and perform additional squaring procedures. Moreover, it is envisioned that a two-person team can quickly and easily assembly the racking assembly 14 using this method.

After assembling the racking assembly 14, the photovoltaic modules 12 are secured to the rails 34 using the top-down fasteners 108, 109 and/or the clip fasteners 110. It is envisioned that the two middle modules 12 will be secured to rails using the locator 117 on the intermediate rails 34. For example, the west side of the east, middle module 12 and the east side of the west, middle module may be placed in abutting relation with the locating bumps 117 on the shoulders 114 of the rails 34. Next, the person(s) assembling will secure modules 12 to the north and south of the two middle modules, and the modules at the east and west ends will be secured last. The modules 12 may be secured to the rails in a different order without departing from the scope of the present invention. The top-down fasteners 108, 109 and/or the clip fasteners 110 are secured to the module frames 18 generally at the quarter-points of each module 12. Each module has four quarter-points: two north quarter points, and two south quarter points.

The quarter-points are located at one-quarter (¼) of the length of the module, and three-quarters (¾) of the length of the module.

It is envisioned that securing the modules 12 to the rails 34 using the clip fasteners 110 will be the preferred choice by the person(s) assembling the racking assembly 14, as the use of the clip fasteners requires less tools, includes less individual components, and is less labor-intensive than the top-down fasteners 108, 109. However, some commercial photovoltaic modules 12 presently on the market do not include a frame 18 with lower flange 24, and therefore, it is not possible to secure these modules using the illustrated clip fasteners 110. Accordingly, in situations where the module frames 12 do not include lower flanges 24, the person(s) assembling the photovoltaic system 10 may use the top-down fasteners 108, 109.

Having described embodiments of the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A module rail for a photovoltaic system, the module rail having a length and comprising:
   a module-supporting surface extending along the length of the module rail for supporting at least one photovoltaic module thereon;
   an upper portion apart from and generally adjacent the module-supporting surface and extending along the length of the module rail, wherein the module-supporting surface comprises first and second module supporting surfaces on opposite sides of said upper portion;
   opposing first and second vertical sidewalls, the first vertical sidewall extending downward from adjacent the first module-supporting surface, and the second vertical sidewall extending downward from adjacent the second module-supporting surface;
   a first set of openings spaced apart from one another along the length of the rail, each of the openings in the first set extending through the upper portion for receiving a first set of fasteners for use in securing at least one photovoltaic module to the module rail; and
   a second set of openings spaced apart from one another along the length of the rail, each of the openings in the second set extending through at least one of the first module-supporting surface and the first sidewall for receiving a second set of fasteners for use in securing at least one photovoltaic module to the module rail.

2. The module rail set forth in claim 1, wherein the openings of the second set are generally adjacent to a juncture of the first module-supporting surface and the first sidewall.

3. The module rail set forth in claim 2, wherein the openings of the second set extend through respective portions of both the first module supporting portion and the second sidewall.

4. The module rail set forth in claim 2, wherein the openings of the second set are generally slot-shaped and have lengths extending generally along the length of the rail.

5. The module rail set forth in claim 1, wherein the upper portion comprises an upper, inverted U-shaped portion having a top and opposing sides extending downward from the top, and wherein the first and second module-supporting surfaces comprise opposite shoulders extending laterally outward from lower ends of the respective sides of the inverted U-shaped portion.

6. The module rail set forth in claim 1, further comprising lower flanges extending laterally outward from lower ends of the respective first and second sidewalls.

7. The module rail set forth in claim 6, further comprising slot-shaped openings in the lower flanges for receiving fasteners for use in securing the rail to at least one pier cap of the photovoltaic system.

8. The module rail set forth in claim 1, further comprising a locator extending upward from at least one of the first and second module-supporting surfaces at a mid-point along the length of the rail for use in locating photovoltaic modules on the rail.

9. The module rail set forth in claim 1, in combination with the second set of fasteners, wherein the second set of fasteners comprises a plurality of clip fasteners for securing at least one photovoltaic module to the module rail, each of the clip fasteners includes upper and lower clip jaws partially defining a press-fit channel, wherein the lower clip jaw is sized and shape for insertion into any one of the openings of the second set to allow the first module-supporting surface and a lower flange of the photovoltaic module to be press-fit into the press-fit channel.

10. The module rail set forth in claim 9, wherein each of the clip fasteners includes a piercing member extending into the press-fit channel, the piercing member configured to pierce an electrically non-conductive outer layer of the lower flange so that the piercing member is in contact with an electrically-conductive material below the outer layer.

11. The module rail set forth in claim 9, in combination with the first set of fasteners, wherein the first set of fasteners comprises a plurality of top-down fasteners, each of the top-down fasteners including a body for engaging at least one photovoltaic module being supported by at least the first module-supporting surface, and a connector extending downward from the body and insertable into any one of the openings of the first set for securing the top-down fastener to the rail.

12. The module rail set forth in claim 1, further comprising third set of openings spaced apart from one another along the length of the rail, each of the openings in the third set extending through at least one of the second module-supporting surface and the second sidewall for receiving a third set of fasteners for use in securing at least one photovoltaic module to the module rail.

13. A photovoltaic system comprising:
   an elongate pier extending upward from the ground, the pier having a length extending from a lower end to an upper end of the pier;
   a pier cap secured to the pier, the pier cap comprising a support beam extending generally transverse to the length of the pier, the pier cap having an upper support surface;

a module rail secured to the upper support surface of the pier cap, the module rail comprising first and second module-supporting surfaces extending along the length of the module rail for supporting at least one photovoltaic module thereon, a central portion extending along the length of the module rail and disposed between and separating the first and second module-supporting surfaces, opposing rail sidewalls extending downward from the respective first and second module-supporting surfaces, a first set of openings spaced apart from one another along the length of the rail and extending through the central portion for use in securing the at least one photovoltaic module to the rail, and a second set of openings spaced apart from one another along the length of the rail and extending through at least one of the first and second module-supporting surfaces and the rail sidewalls for use in securing the at least one photovoltaic module to the rail, wherein the second set of openings are adjacent a juncture of at least one of the module-supporting surfaces and the corresponding sidewalls;

at least one photovoltaic module secured to the module rail; and at least one of: a first fastener inserted in one of the openings of the first set and engaging the at least one photovoltaic module to secure the at least photovoltaic module to the module rail; and a second fastener inserted in one of the openings of the second set and engaging the at least one photovoltaic module to secure the at least photovoltaic module to the module rail.

14. The photovoltaic system set forth in claim 13, wherein the second fastener is inserted in one of the openings of the second set and engages the at least one photovoltaic module to secure the at least photovoltaic module to the module rail.

15. The photovoltaic system set forth in claim 14, wherein the second fastener comprises a clip fastener including upper and lower clip jaws partially defining a press-fit channel, and wherein the lower clip jaw is inserted into the opening of the second set and one of the module-supporting surfaces and a lower flange of the photovoltaic module is press-fit into the press-fit channel.

16. A racking assembly for a photovoltaic system, the racking assembly comprising:

a module rail comprising a module-support portion for supporting at least one photovoltaic module, opposing sidewalls extending downward from opposite sides of the module-support portion, opposite lower flanges extending outward from lower ends of the respective sidewalls, and a rail fastener opening in at least one of the lower flanges;

at least one pier cap securable adjacent an upper end of a pier, the at least one pier cap comprising a support beam having an upper support surface for supporting the module rail, and a rail fastener extending upward from the upper support surface for securing the rail to the upper support surface;

wherein the rail fastener opening and the rail fastener are configured such that the rail fastener is insertable up through the rail fastener opening from below the rail and the rail fastener is thereafter positionable with respect to the rail fastener opening to engage the lower flange for securing the rail to the at least one pier cap.

17. The racking assembly set forth in claim 16, wherein the rail fastener has a head and a shaft having an upper portion extending above the upper support surface of the pier cap, wherein the rail fastener opening has a clearance portion through which the head of the rail fastener is insertable from below the rail, and a narrower slot-shaped portion sized and shaped to allow the upper portion of the shaft to slide therealong and to inhibit withdrawal of the head of the rail fastener therethrough.

18. The racking assembly set forth in claim 16, wherein rail fastener comprises a twist-lock fastener including a head that is rotatable between an unlocked position, in which the head is insertable up through the rail fastener opening from below the rail, and a locked position, in which the head is engageable with the lower flange of the rail.

19. The racking assembly set forth in claim 16, wherein the at least one pier cap further comprises at least one pier cap hanger secured to the support beam, and the at least one pier cap hanger is configured to engage an upper end of the pier to hang the pier cap in a selected position on the pier.

20. The racking assembly set forth in claim 19, wherein the pier cap further comprises at least one pier clamp secured to the support beam, and the at least one pier clamp is configured for clamping the pier cap on the pier.

* * * * *